(12) United States Patent
Dilling

(10) Patent No.: US 10,953,522 B2
(45) Date of Patent: Mar. 23, 2021

(54) FASTENER SYSTEM WITH STABILIZER RIBS

(71) Applicant: Phillips Screw Company, Burlington, MA (US)

(72) Inventor: Gary Dilling, Gardiner, MA (US)

(73) Assignee: Phillips Screw Company, Wakefield, MA (US)

( * ) Notice: Subject to any disclaimer, the term of this patent is extended or adjusted under 35 U.S.C. 154(b) by 93 days.

(21) Appl. No.: 15/616,461

(22) Filed: Jun. 7, 2017

(65) Prior Publication Data

US 2018/0009090 A1 Jan. 11, 2018

Related U.S. Application Data

(60) Provisional application No. 62/360,741, filed on Jul. 11, 2016.

(51) Int. Cl.
| | |
|---|---|
| B25B 15/00 | (2006.01) |
| F16B 23/00 | (2006.01) |
| B25B 21/00 | (2006.01) |
| B21K 1/46 | (2006.01) |

(52) U.S. Cl.
CPC ............ B25B 15/005 (2013.01); B21K 1/463 (2013.01); F16B 23/0023 (2013.01); B25B 21/00 (2013.01)

(58) Field of Classification Search
CPC . B25B 15/004; B25B 15/005; F16B 23/0007; F16B 23/0023; F16B 23/0069; F16B 23/0076
USPC .......................................... 81/460, 461, 436
See application file for complete search history.

(56) References Cited

U.S. PATENT DOCUMENTS

| | | | |
|---|---|---|---|
| 2,800,829 A | 7/1957 | West | |
| 2,028,781 A | 4/1962 | Muenchinger | |
| 3,108,623 A | 10/1963 | Muenchinger | |
| 3,120,012 A | 2/1964 | Muenchinger | |
| 3,237,506 A * | 3/1966 | Muenchinger | F16B 23/0023 411/404 |
| 3,238,540 A | 3/1966 | Muenchinger | |
| 3,357,295 A | 12/1967 | Smith | |
| 3,439,413 A | 4/1969 | Stillwagon, Jr. | |
| 4,084,478 A | 4/1978 | Simmons | |

(Continued)

FOREIGN PATENT DOCUMENTS

| | | |
|---|---|---|
| CN | 1257971 A | 6/2000 |
| CN | 103185055 A | 7/2013 |

(Continued)

OTHER PUBLICATIONS

Taiwanese Office Action dated Oct. 16, 2018, issued in corresponding Taiwanese Application No. 106122205 with English language translation.

(Continued)

*Primary Examiner* — David B. Thomas
*Assistant Examiner* — Makena S Markman
(74) *Attorney, Agent, or Firm* — Merchant & Gould, P.C.

(57) ABSTRACT

Fasteners, drivers, punches, fastener systems, and methods of making fasteners, drivers, punches, and fastener systems are disclosed herein. The fasteners may include a recess having a groove in an inner transition surface. Corresponding drivers may include one or more stabilizing ribs for interfacing with the groove in the fastener recces for providing stability.

52 Claims, 17 Drawing Sheets

(56) References Cited

U.S. PATENT DOCUMENTS

| | | | |
|---|---|---|---|
| 4,089,357 A * | 5/1978 | Gill | F16B 23/0023 |
| | | | 81/460 |
| 4,126,908 A | 11/1978 | Gill | |
| 4,464,957 A | 8/1984 | Gill | |
| 5,120,173 A | 6/1992 | Grady | |
| 5,203,742 A | 4/1993 | Grady | |
| 5,957,645 A | 9/1999 | Stacy | |
| 6,223,634 B1 | 5/2001 | Hughes et al. | |
| 6,234,914 B1 | 5/2001 | Stacy | |
| 6,367,358 B1 * | 4/2002 | Stacy | B21K 1/463 |
| | | | 81/436 |
| 6,575,062 B2 | 6/2003 | Hahn | |
| 6,601,482 B2 * | 8/2003 | Hughes | B25B 15/005 |
| | | | 411/404 |
| 6,786,827 B2 | 9/2004 | Hughes | |
| 6,843,729 B2 | 1/2005 | Hughes | |
| 6,852,037 B2 * | 2/2005 | Hughes | B25B 15/005 |
| | | | 470/148 |
| 6,886,433 B2 | 5/2005 | Totsu | |
| 6,890,139 B2 | 5/2005 | Hughes | |
| 7,077,038 B2 | 7/2006 | Toyooka et al. | |
| 7,891,274 B2 | 2/2011 | Dilling | |
| 8,171,826 B2 | 5/2012 | Dilling | |
| 8,291,795 B2 * | 10/2012 | Hughes | B25B 15/005 |
| | | | 81/460 |
| 8,387,491 B2 | 3/2013 | Dilling | |
| 2002/0029665 A1 | 3/2002 | Hughes et al. | |
| 2005/0047891 A1 | 3/2005 | Toyooka et al. | |
| 2005/0249573 A1 | 11/2005 | Tanner | |
| 2006/0233626 A1 | 10/2006 | Lin | |
| 2009/0257844 A1 | 10/2009 | Chou et al. | |
| 2011/0217143 A1 | 9/2011 | Hughes et al. | |
| 2014/0060268 A1 * | 3/2014 | Goss | B25B 15/004 |
| | | | 81/460 |
| 2016/0059391 A1 * | 3/2016 | Hettich | B25B 15/005 |
| | | | 81/460 |

FOREIGN PATENT DOCUMENTS

| | | |
|---|---|---|
| JP | 2003-13924 A | 1/2003 |
| TW | 200303398 | 9/2003 |
| TW | 201540968 A | 11/2015 |
| WO | 2004/065067 A1 | 8/2004 |
| WO | 2017/218233 A1 | 12/2017 |

OTHER PUBLICATIONS

Supplementary European Search Report and European Search Opinion issued in corresponding application EP 17828127 dated Feb. 5, 2020.

Office Action issued in counterpart Taiwanese application 108110653 dated Oct. 28, 2019.

"National Document 2018-3624" found to be related to the subject and scope of application as cited on Search Report, filed in Chile dated Dec. 14, 2018; corresponds to WO 2017/218233 A1.

Search Report issued in corresponding Chilean application 201900069 dated Jan. 15, 2020.

* cited by examiner

FASTENER SYSTEM WITH STABILIZER RIBS

RELATED APPLICATIONS

This application claims priority under 35 U.S.C. § 119(e) to U.S. provisional patent application 62/360,741 filed on Jul. 11, 2016, which is hereby incorporated by reference in its entirety herein.

BACKGROUND

Use of powered tools to drive threaded fasteners at high speed and high torque loads results in high forces applied by the driver to the fastener. Although many threaded fastener drive systems, particularly those with a driver-engageable recess in the fastener head, are designed to have surfaces that are engaged by corresponding surfaces on the driver, such ideal surface-to-surface engagement, at best, is difficult to achieve in practice. Rather than surface-to-surface engagement between the driver and fastener, by which the driving load can be distributed over a broad surface area, driver-recess engagement often is concentrated in small areas or points. Further, this is exasperated when the driver-recess engagement is not in line.

This may result from a number of factors such as inconsistencies in the manufacture of the fastener or the driver, as well as difficulties encountered in the field. Field-encountered difficulties may include, for example, misalignment of the driver and fastener or inability to fully seat the driver in the recess because of paint or other debris that may have collected in the recess. Even slight misalignment between the driver and the fastener, or a variation of the fastener or driver from design specifications, can result in substantial reduction in the area of contact between the driver and fastener, in many cases resulting in near point-like contact of several portions of the driver and fastener. Application of high torque under such circumstances necessarily results in concentrated stresses in the materials of the driver and the recess that, in turn, can lead to failure of the material, either by plastic deformation or fracture. Even slight plastic deformation of the engagement surfaces of the recess and driver can adversely affect system performance. If the recess deforms to define ramp-like surfaces inclined from the vertical, the driver may "cam-out" of the recess under the influence of the applied load. Such cam-out is undesirable, not only because it results in premature or uncontrollable disengagement of the driver and recess, but also because the suddenly disengaged driver can slip onto and damage the work piece. Additionally, excessive stress in the driver blade while driving the fastener can cause the blade to deform in a manner that reduces the surface area contact with the fastener and effectively shifts the region of contact radially inwardly, thereby reducing the effectiveness of driver-recess engagement and increasing the risk of failure.

It would be desirable to provide improvements in recessed head fasteners and drivers by which the foregoing and other difficulties are reduced or eliminated and stability is increased.

SUMMARY

Disclosed herein are various fasteners, fastener systems, drivers, punches, and methods of forming fasteners systems. Example fasteners may include a driver-engageable recess formed at an end thereof, the recess including a central core having a bottom region and a plurality of wings radiating outwardly from the central core, the wings each being defined by a pair of sidewalls and an outer transition surface adjoining the sidewalls, the outer transition surface extending from a top of the recess and connected to the bottom region and forming a bottom region transition edge at the intersection of the bottom region and the outer transition surface. In one example, a fastener may include an inner transition surface connecting a sidewall of a first wing to a sidewall of a second wing, the first and second wings being adjacent to each other. In another example, the fastener may include a groove in an inner transition surface extending in a radially outward direction from the inner transition surface, the groove extending from a first distance from the bottom region transition edge to a second distance from the bottom region transition edge. In one particular example, the first distance is non zero. In one example, the groove extends to a top of the recess. And in yet another example the groove comprises a first and second groove walls, the first and second groove walls meeting at a groove apex, the groove apex being tapered radially inward toward a longitudinal axis of the fastener as the recess groove extends in a direction from the top of the recess toward the bottom region.

In one example, a groove apex is tapered at an angle of about 10.4 degrees from the longitudinal axis of the fastener. In another example, there is an angle of about 50.4 degrees between a first and a second groove walls. In one example, a groove apex intersects the inner transition surface at the first distance from the bottom region transition edge. And in yet another example a bottom region has a bottom recess tip that is a third distance from the bottom region transition edge. An in one example the first distance is greater than about 0.04 inches.

Disclosed herein are example fasteners, where, in one example a first and second intersection lines, formed at the intersection of the first and second groove walls with the transition surface, respectively, form an angle of between about 6.5-7.0 degrees between them. In another example the inner transition surface is tapered at an angle of between about 3.5 degrees and about 4.0 degrees from a longitudinal axis of the fastener. In one example at least one of the sidewalls further includes a relieved region defined radially inward of its associated outer transition surface to define a relatively raised torque pad between its respective outer transition surface and the relieved region, the torque pad being an elongate strip and extending longitudinally along a margin of the sidewall that adjoins the outer transition surface. And in yet another example the recess comprises four wings and at least two of the inner transition surfaces have the recess groove. And in yet another example at least one of the sidewalls is configured to define a segment of a spiral. In one example, at least one of the inner transition surfaces includes an interference surface having a top and a distance from the top to the bottom region transition edge is less than the first distance.

Disclosed herein are fastener systems. In one example a fastener includes a central recess core having a bottom region. In one example a fastener includes a plurality of wings radiating outwardly from the central recess core, the wings each being defined by a pair of recess sidewalls and a recess outer transition surface adjoining the recess sidewalls, the recess outer transition surface extending from a top of the recess and connected to the bottom region and forming a bottom region transition edge at the intersection of the bottom region and the outer transition surface. And in another example, at least one recess inner transition surface connecting a recess sidewall of a first wing to a recess sidewall of a second wing, the first and second wings being adjacent to each other. And in yet another example a recess includes a groove in the inner transition surface extending in a radially outward direction from the inner transition surface, the groove extending from a first distance from the bottom region transition edge to a second distance from the bottom region transition edge. And in yet another example, the first distance being non zero.

In one example a fastener system includes a driver for engaging the recess of a fastener, the driver including a shank portion and a recess-engaging portion formed at an end of the shank portion, the recess-engaging portion comprising a central driver core having an end region and a plurality of lobes radiating outwardly from the driver central core, each lobe being defined by a pair of driver sidewalls and a driver outer transition surface adjoining the driver sidewalls, the driver outer transition surface extending from the shank portion and connected to the end region and forming an end region outer transition edge at the intersection with the driver end region. And in yet another example, at least one driver inner transition surface connecting a driver sidewall of a first lobe to a driver sidewall of a second lobe, the first and second lobes being adjacent to each other. In one example, a driver includes a stabilizing rib on the driver inner transition surface extending in a radially outward direction from the driver central core, the stabilizing rib extending from a first distance from end region outer transition edge to a second distance from the end region outer transition edge, the first distance being non-zero. And in yet another example the groove comprises a first and second groove walls, the first and second groove walls meeting at a groove apex, the groove apex being tapered radially inward as the recess groove extends in a direction from the top of the recess toward the bottom region. And in another example, a stabilizer rib comprises a first and second rib walls, the first and second rib walls meeting at a rib apex, the rib apex being tapered radially inward as the stabilizer rib extends toward the end region.

In one example, the groove apex is tapered at an angle with respect to a longitudinal axis of the fastener and the stabilizer apex is tapered at an angle with respect to a longitudinal axis of the driver, the groove apex taper angle being larger than the stabilizer apex taper. And in another example a groove apex is tapered at an angle of about 10.4 degrees from the longitudinal axis of the fastener. And in another example the stabilizer apex is tapered at an angle of about 7.5 and 8.5 degrees from the longitudinal axis of the driver. And in yet another example, there is an angle of about 50.4 degrees between the first and second groove walls. In one example wherein there is an angle of about 70 degrees between the first and second stabilizer walls. In another example, the groove apex intersects the inner transition surface at the first distance from the bottom region transition edge. And in yet another example the stabilizer apex meets the inner transition surface at the first distance from the end region outer transition edge.

In one example of disclosed fastener systems, a first and second intersection line, formed at the intersection of the first and second groove walls with the recess inner transition surface, respectively, form an angle of between about 6.5-7.0 degrees between the groove walls. In another example the driver inner transition surfaces are tapered at an angle with respect to the longitudinal axis of the driver and the recess inner transition surfaces are tapered at an angle with respect to the longitudinal axis of the recess, the driver inner transition surface taper angle being less than the recess inner transition surface taper angle. And in yet another example the recess inner transition surface is tapered at an angle of about 3.5-4.0 degrees, inclusive from a longitudinal axis of the fastener. And in another example the driver inner transition surface is tapered at an angle of about 2.25-2.75 degrees, inclusive from a longitudinal axis of the fastener. And in yet another example, at least one of the recess sidewalls further comprises a relieved region defined radially inwardly of its associated recess outer transition surface to define a relatively raised torque pad between the recess outer transition surface and the recess central core, the torque pad being an elongate strip and extending longitudinally along a margin of the sidewall that adjoins the outer transition surface.

In a further example, disclosed example faster systems include a recess having four wings and at least two of the inner transition surfaces have the recess groove. In one example a driver includes at least one torque rib formed on at least one sidewall of at least one of the sidewalls of the lobes, the at least one torque rib being oriented to extend substantially perpendicular to the outer transition surface of the lobe and increasing in cross-sectional area in a radially outward direction. In another example, a radially outermost end of the at least one torque rib define the widest portion of the lobe. And in another example, at least one torque rib is generally triangular in a transverse cross-section. And in yet another example, at least one of the recess inner transition surfaces comprises an interference surface having a top defined by a design recess interference region and a distance from the top to the bottom region transition edge is less than the first distance to the groove. In one disclosed fastener system, at least one of the driver inner transition surfaces comprises an interference surface having a top defined by a design driver interference region and a distance from the top to the end region outer transition edge is less than the first distance to the stabilizing rib. And in another example fastener system, the fastener system includes a clearance distance between the top of the recess interference region and the groove. And in yet another example fastener system, the fastener system includes a clearance distance between the top of the driver interference region and the rib.

Disclosed herein are methods of forming a threaded fastener. In one example method, the method includes forming a threaded fastener having a driver-engageable recess formed at an end thereof. In one example, the method includes using a punch to form the recess, the punch including, a central core having a bottom forming portion and a plurality of wing forming portions radiating outwardly from the central core, the wing forming portions each being defined by a pair of sidewall forming portions and an outer transition surface forming portion adjoining the sidewall forming portions, the outer transition surface forming portion connected to the bottom region forming portion and forming a bottom region transition edge forming portion at the intersection of the bottom region forming portion and the outer transition surface forming portion. In another example method, the punch includes at least one inner transition surface forming portion connecting a sidewall forming portion of a first wing forming portion to a sidewall of a second wing forming portion, the first and second wing forming portions being adjacent to each other. In yet another example method, the punch includes a groove forming portion in the inner transition surface forming portion extending in a radially outward direction from the inner transition surface forming portion, the groove forming extending from a first distance from the bottom region transition edge forming portion to a second distance from the bottom region transition edge forming portion, the first distance being non zero.

In one example method, the punch includes a groove forming portion having a first and second groove wall forming portions, the first and second groove wall forming portions meeting at a groove apex forming portion, the groove apex forming portion being tapered radially inward toward a longitudinal axis of the fastener as the recess groove forming portions extends in a direction from a body toward the bottom region forming portion. In another example method, a punch includes a groove apex forming portion is tapered at an angle of about 10.4 degrees from the longitudinal axis of the punch.

Additional details will be provided in the accompanying figures and the detailed description below.

DETAILED DESCRIPTION

Figure 1:
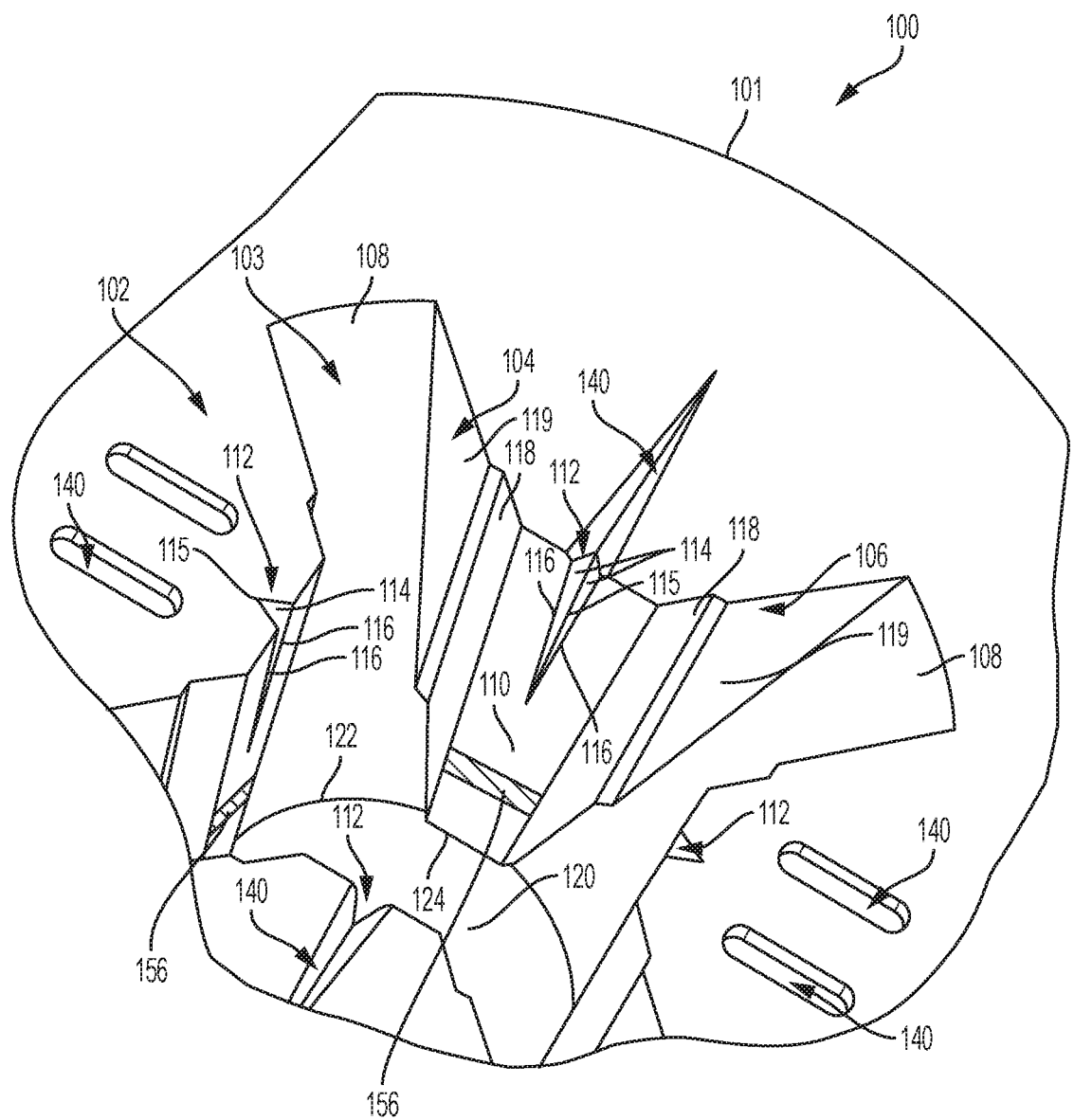
FIG. 1 is a partial perspective view of an example fastener recess in accordance with disclosed embodiments.

Like reference numerals throughout this specification refer to similar features throughout the figures.

Figure 2:
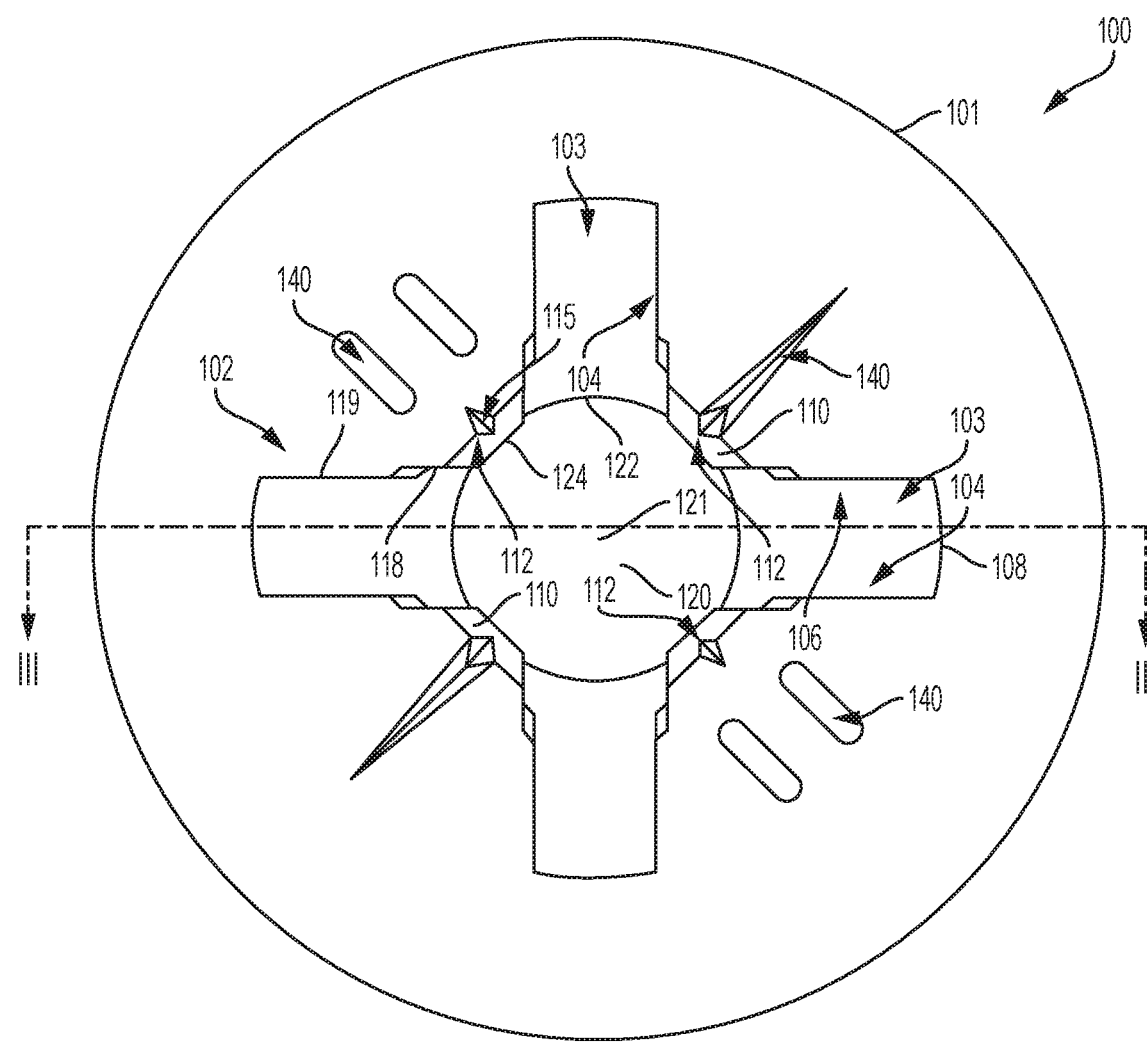
FIG. 2 is an end view of an example fastener recess in accordance with disclosed embodiments.
Figure 3:
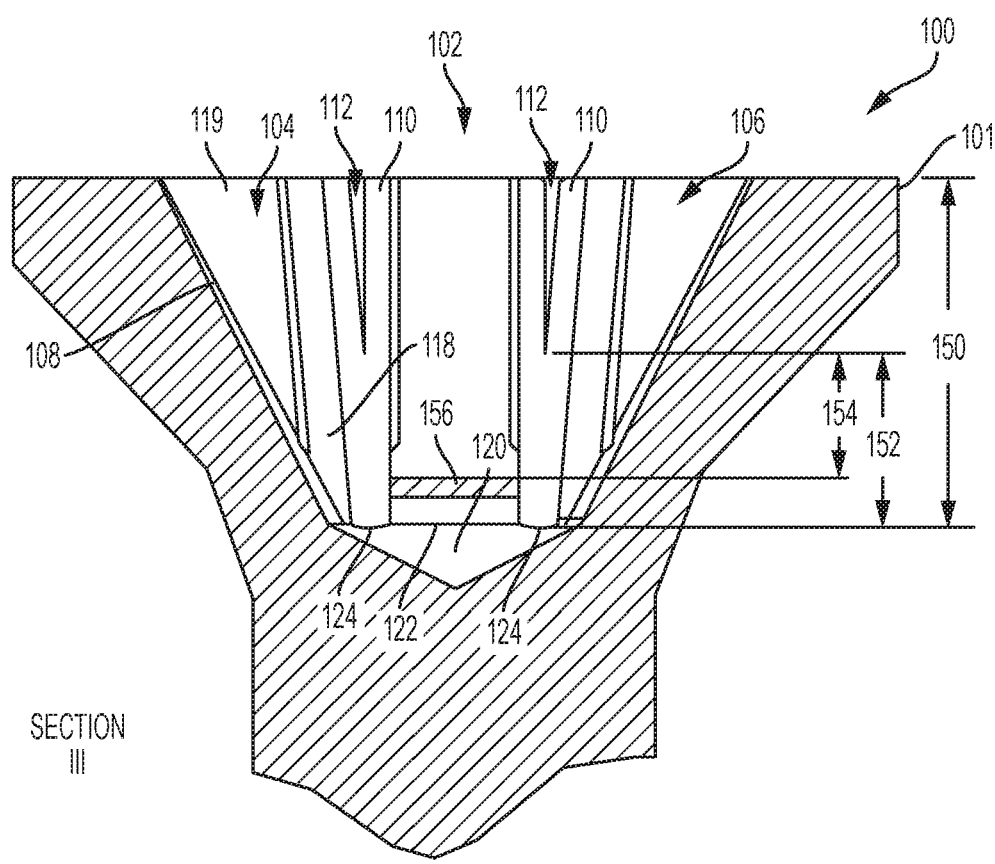
FIG. 3 is a cross section view of the example fastener recess of FIG. 2 in accordance with disclosed embodiments.
Figure 4:
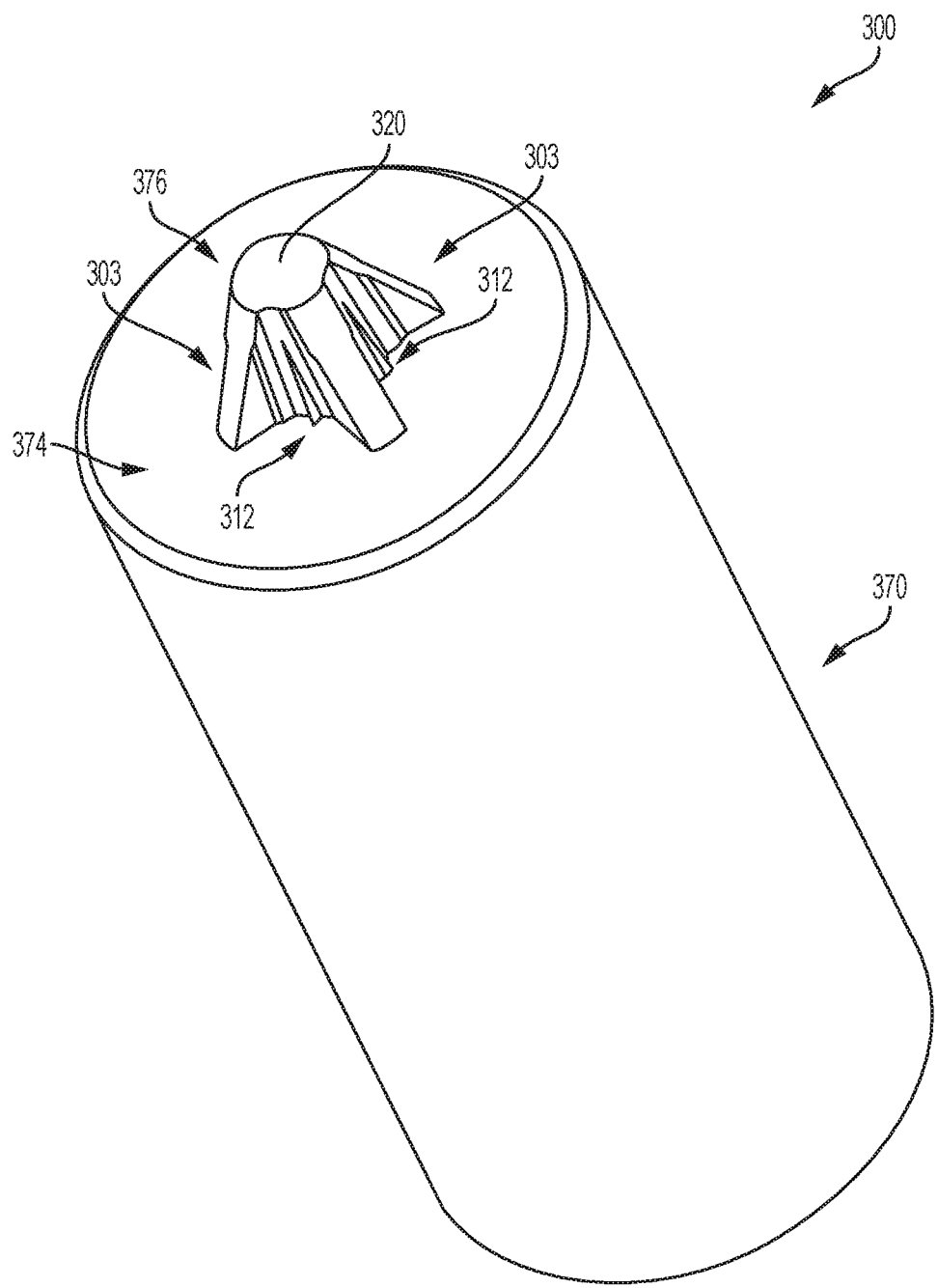
FIG. 4 is a perspective view of an example punch in accordance with disclosed embodiments.
Figure 5:
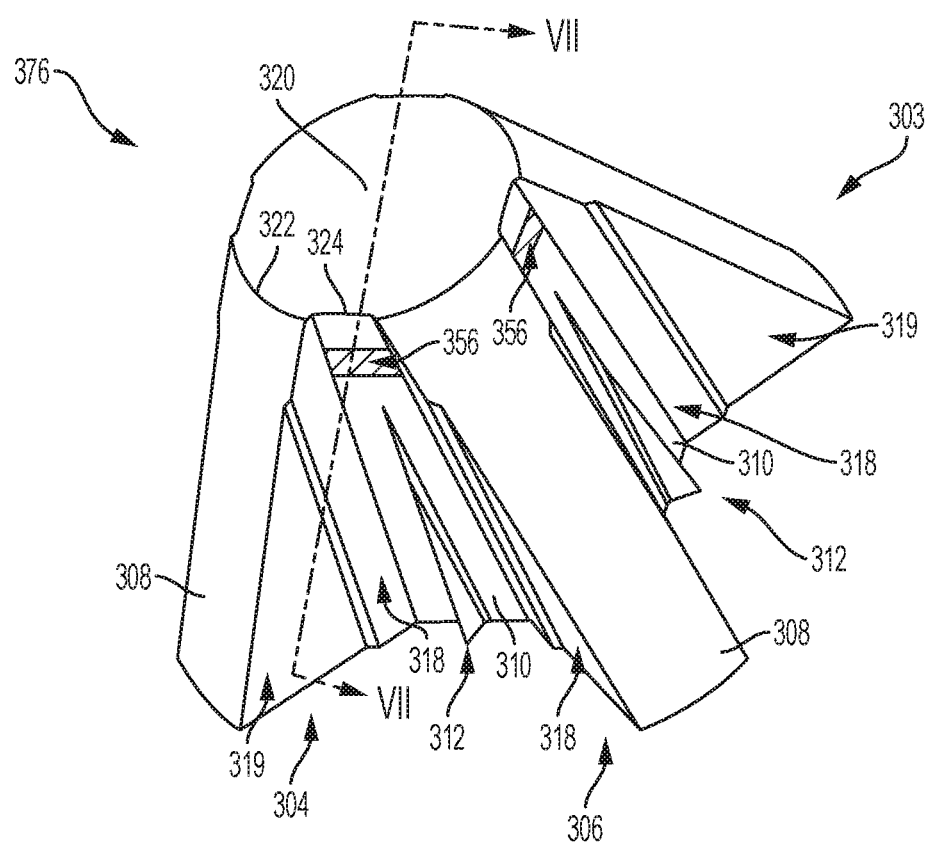
FIG. 5 is a perspective view of an example punch in accordance with disclosed embodiments.

FIGS. 1-3 show various views of an example fastener recess. Fastener 100 has a driver-engageable recess 102 formed in head 101. The driver-engageable recess is of polygonal form that may be defined as generally cruciform in plan. The recess includes a central core and a plurality of wings 103 that radiate outwardly from the central portion. The wings 103 are each defined by an installation sidewall 104, a removal sidewall 106, which are separated from each other by an outer transition surface 108, which is shown as downwardly (away from the head 101) and inwardly inclined. The sidewalls 104 and 106 are referred to herein as installation sidewalls 104 and removal sidewalls assuming a right handed fastener thread. An inner transition surface 110 extends between the installation and removal surfaces of adjacent wings.

In one example, the wings 103 generally conform in dimension to that of a standard cruciform shape, for example the dimensions described with respect to various cruciform recesses within the Industrial Fasteners Institute's *IFI Inch Fastener Standards Book*, 9$^{th}$ edition, 2014 ("the IFI standards", see, for example, an excerpt of which is enclosed herein as appendix A), which is herein incorporated by reference in its entirety. For the remainder of this disclosure a reference to "standard" refers to those standards established by the IFI standards unless otherwise specified. The inner transition surfaces 110, in one example, generally conform to the shape of a standard square recess, for example those square recesses described in the IFI standards. Modifications to those standards will be apparent from the present disclosure. The recess 102, having wings 103 and inner transition surfaces 110, along with a corresponding driver, may in one example generally conform to the various dimensions of a Phillips Square-Driv® (PSD) recess and driver, available as of this writing from Phillips Screw Company of Burlington, Mass., USA. However, features of the present disclosure may also be incorporated into non-driving surfaces of other fasteners and fastener systems. For example, embodiments of the present disclosure can be incorporated into existing fastener designs, for example Phillips Screw Company's commercially available fasteners, for example, those available under the trade designations Pozidriv®, Torq-Set®, Tri-Wing®, Phillips II®, Hexstix®, Torq-Set®, Mortorq®, Mortorq® Super, External Mortorq® Super, among other multi-winged fasteners having, for example, 2, 3, 4, 5, 6, or more wings. In addition, those fasteners/drivers disclosed that are, at least in part, defined by spiral segments, for example, those described in U.S. Pat. Nos. 5,957,645, 6,234,914, and 6,367,358 issued to Stacy (the Stacy patents), U.S. Pat. Nos. 7,891,274, 8,171,826, and 8,387,491 issued to Dilling (the Dilling patents), and U.S. provisional pat. application No. 62/351,540 filed on Jun. 17, 2016 (the '540 application), all of which are commonly owned with this application. The disclosures of these patents are incorporated herein by reference in each of their entireties.

Continuing with the example embodiments of FIGS. 1-3, the outer transition surfaces 108 and the inner transition surfaces 110 merge into a generally concave recess bottom region 120. The outer transition surfaces 108 meet the bottom region 120 at bottom region transition edge 122. The inner transition surfaces 110 meet the bottom region 120 at the inner transition bottom edge 124. At least one inner transition surface 110 includes a groove 112 within the inner transition surface 110. The groove 112 extends radially outward from the inner transition surface. Therefore, a driver conforming to the dimensions of the recess 102 will fit within the recess 102 whether or not the driver includes a stabilizing rib (discussed in more detail below). The groove(s) 112 interact with corresponding stabilizing rib(s) to stabilize the driver within the recess and to minimize rocking of the driver. This feature will be discussed further below.

In one example, the recess 102 includes more than one inner transition surfaces 108 having a groove 112. For example, in one embodiment, diametrically opposed inner transition surfaces each have grooves 112. The recess 102 can include, for example, any number of pairs of diametrically opposed grooves 112. As shown in FIGS. 1-2, the recess 102 includes two pairs of diametrically opposed grooves 112, or in the alternative one, three, four, or more pairs for recesses with different configurations.

The groove 112, in one example, includes groove walls 114 connected together at groove apex 115. The groove walls intersect the inner transition surfaces 110 at intersection lines 116. The angle between the groove walls may be any angle configured to provide the desired stability and also based on the size and configuration of the recess. In one example, the angle between the groove walls 114 is between about 40 degrees and about 60 degrees, or about 50.4 degrees for a PSD size 1-2 recess. In one example, a PSD size nomenclature M-N refers to a PSD recess/driver conforming to an "M" size square and a "N" size Phillips/cruciform in accordance with sizes available from Phillips Screw Company and as disclosed in the IFI standards.

The inner transition surfaces 110, in one example, are tapered inward toward the longitudinal axis of the fastener from the top of the recess towards the bottom region 120. The taper of the inner transition surfaces 110 establishes interference surfaces 156 (indicated in diagonal markings) for providing an interference fit with cooperating surfaces of the corresponding driver.

One or both of the installation or removal sidewalls 104,106 may be provided, in one example, with a relieved region 118 that extends from the upper edge of the corresponding sidewall 104,106 downwardly toward the bottom of the sidewall. The relieved regions 118 are formed so that the unrelieved portion of their respective sidewall defines a torque pad 119 in the form of a relatively raised strip that extends along the outer margin of its associated sidewall, that is, where the sidewall meets with the outer transition surface 108 of the wing 103. The torque pad 119 is intended to be engaged by the most radially outward regions of the lobes of the mating driver to assure that the driving torque will be applied to the recess drive walls at the most radially outward location of the recess drive walls. The relieved region 118 is designed and configured so that the driver blade, in one example, will not engage those portions of the sidewalls 104, 106 defined by the relieved regions 118. Additional information regarding example torque pads and relieved regions 118 may be found, for example in U.S. Pat. Nos. 6,223,634, 6,601,482, and 6,786,827 to Hughes et al ("the '634 patents"), which are herein incorporated by reference in their entirety. By maintaining engagement of the driver blades with the outermost regions of the sidewalls, the moment arm of the applied torque is maximized, thereby reducing the force necessary to develop the desired level of torque and, consequently reducing the risk of undesirable deformation of the recess. The top of the recess may also include head markings 140, which may contact a top surface of the grooves 112 without detrimental impact to the grooves 112.

With respect to FIG. 3, groove 112 begins a distance 152 from the bottom region transition edge 122 and continues to the top of the recess 102, which is a distance 150 from the bottom region transition edge 122. In one particular example, distance 152 is greater zero such that the groove 112 does not extend to the bottom region 120 thus not interfering with a stick fit feature. In one particular example, groove 112 has a groove clearance distance 154 greater than about zero from the top of the interference surface 156.

Disclosed example recesses may be formed by a heading punch adapted to form the head of the fastener with the disclosed corresponding recess. The recess can be formed in conventional heading techniques in, for example, a two blow header. FIGS. 4-8 illustrate a punch 300 configured to form an example disclosed recess. The punch is a positive corresponding to the negative of the recess 102 embodiments described with respect to FIGS. 1-3. Thus, features and dimensions described with reference to disclosed punches 300 are also applicable to corresponding recess 102 features and embodiments and vice versa.

The punch includes body portion 370 having a face 374 and an integral nib 376 that protrudes from the face 374. The nib 376 is the complement of the shape of the recess and the face of the punch is of complementary shape to that of the intended screw head, shown here as a flathead. With respect to FIG. 5, the nib 376 includes a central core and a plurality of wing forming portions 303 that extend generally radially and outwardly from the core. Each wing forming portion 303, as shown, includes a relieved region forming portion 318 and a torque pad forming portion 319 forming the respective installation and removal sidewall forming portions 304, 306, and an outer transition surface forming portion 308. An inner transition surface forming portion 310 extends between the installation and removal surface forming portions of adjacent wings.

The outer transition surface forming portion 308 and the inner transition surface forming portions 310 merge into a bottom region forming portion 320. The outer transition surface forming portions 308 meet the bottom region forming portions 320 at bottom region transition edge forming portion 322. The inner transition surface forming portions 310 meet the bottom region forming portion 320 at the inner transition bottom edge forming portion 324. At least one inner transition surface forming portions 310 includes a groove forming portion 312 in the inner transition surface forming portion 310. The groove forming portion 312 extends radially outward from the inner transition surface forming portion 310.

The inner transition surface forming portions 310, in one example, are tapered inward toward the longitudinal axis of the punch 300 from the body portion 370 towards the bottom region forming portion 320. The taper of the inner transition surface forming regions 310 establish (on the corresponding formed recess) interference surfaces, which are shown on the punch as interference surface gauging area 356 (indicated in diagonal markings). The location of the resulting interference surfaces on the formed recess will depend on the size and configuration of the recess and the size and configuration of the driver used within the recess. For example, the resulting interference surface 156 (FIGS. 1 and 3) are regions of the inner transition surface 110 in which the corresponding driver is designed to make contact with the recess (before applying installing or removing torque) and where an interference or stick-fit occurs between the recess and the driver. During manufacture and operation of the punch, the interference surface forming gauging area 356 can be checked (or gauged) to ensure interference surface gauging area 356 fall within design tolerances. Provided the inference surface gauging area 356 is within tolerances, the interference fit between the recess and the driver should occur in the proper location, i.e. between the groove 112 and bottom region 120 of the recess and between the stabilizing rib 212 and the end region 220 of the driver, discussed below. This location of the interference surface/interference surface gauging area 356 can be altered, that is moved higher or lower in the recess (and on the corresponding recess forming punch) depending on the recess/driver design and at what recess depths an interference fit is desired.

Figure 6:
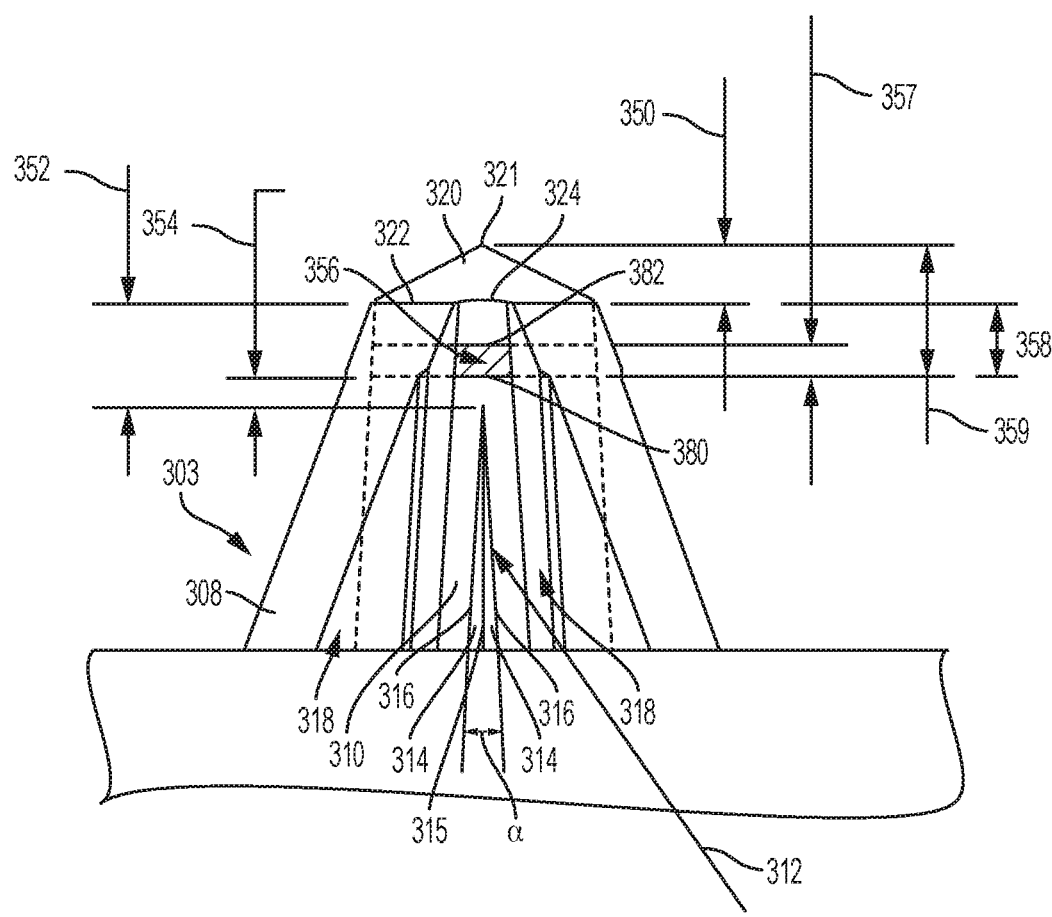
FIG. 6 is a side view of an example punch in accordance with disclosed embodiments.

With reference to FIG. 6, the groove forming portion 312, in one example, includes groove wall forming portions 314 connected together at groove apex forming portion 315. The groove wall forming portions intersect the inner transition surface forming portions 310 at intersection lines 316. The angle between the groove wall forming portions may be any angle configured to provide the desired recess groove. In one example, the angle δ (FIG. 8) between the groove wall forming portions 314 is between about 40 degrees and about 60 degrees, or about 50.4 degrees for a PSD size 1-2 recess. The angle α between the intersection lines 316, within the plane of the inner transition surface forming portion 310, is between about 6.5 and about 7.0 degrees, inclusive, for a punch design to form a recess for a PSD size 1-2 recess.

The bottom region forming portion has a distance 350 between a tip forming portion 321 and the bottom region transition edge forming portion 322. The top 380 of the interference surface gauging area 356 is a distance 358 from the bottom region transition edge forming portion 322 and has a distance 357 between the top 380 and bottom 382 of the interference surface gauging area 356 defining, in one example, the location of acceptable design limits of the interference surface gauging area 356 for gauging. Distance 357, in one example may be between about 0.001 inches and about 0.012 inches, inclusive. And in one example is about 1 hundredth of an inch. Or, for example, about 0.012 inches. And in another example, no more than 0.012 inches.

The top 380 of the interference surface gauging area 356 has a distance 359 from a tip forming portion 321. Groove forming portion 312 may begin, i.e., the point of intersection of intersecting lines 316 to each other and the inner transition surface forming portion 310, at a distance 352 from the bottom region transition edge forming portion 322, resulting in a clearance distance 354 between the top 380 of the interference surface gauging area 356 and the groove forming portion 312.

The clearance distance 354 may be determined to provide clearance from the interference surface gauging area 356 such that the groove forming portion 312 will not interfere with gauging the interference surface gauging area 356 of inner transition surfaces 310. Gauging is important to ensure that formed fasteners are within tolerances. In one example, the clearance distance 354 may also depend on the desired amount of engagement between the resulting groove and driver stabilizer rib, discussed in more detail below. In certain non-limiting examples, the clearance distance 354 may be between about 0.005 inches and about 0.011 inches, inclusive, between about 0.005 and about 0.012 inches, inclusive, or about 0.011 inches.

Table 1 includes non-limiting examples of the dimension references discussed with reference to FIG. 6. The example dimensions are listed with reference to corresponding PSD driver sizes. The drivers are commercial available from Phillips Screw Company.

TABLE 1

(inches)

| | DRIVE SIZE | | | | | |
|---|---|---|---|---|---|---|
| | 359 | 354 | 357 | 350 | 352 | 358 |
| PSD 0-1 | .057 | .005 | .012 | .013 | .049 | .044 |
| PSD 1-2 | .052 | .011 | .012 | .023 | .040 | .029 |

TABLE 1-continued (inches)

| | DRIVE SIZE | | | | | |
|---|---|---|---|---|---|---|
| | 359 | 354 | 357 | 350 | 352 | 358 |
| PSD 2-2 | .074 | .011 | .012 | .023 | .062 | .051 |
| PSD 3-3 | .069 | .011 | .012 | .039 | .041 | .030 |

Dimension Formulas:
(359 + 354) − 350 = 352
359 − 350 = 358

Figure 7:
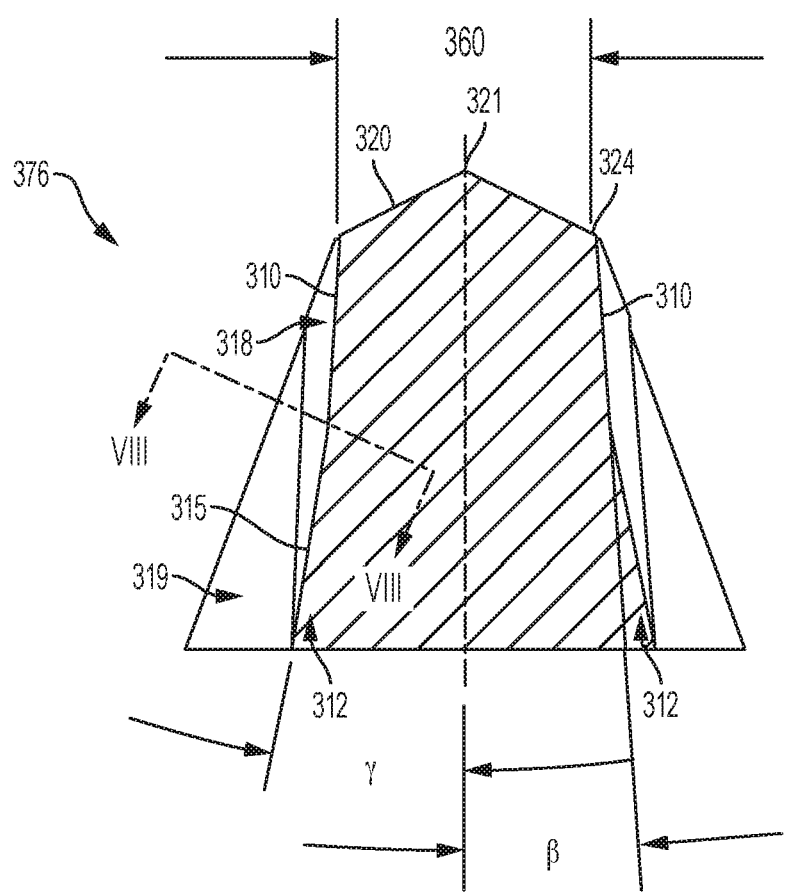
FIG. 7 is a cross section of an example punch in accordance with disclosed embodiments.

With reference to FIG. 7, in one example, the distance 360 between the opposing inner transition surfaces 310 at the inner transition bottom edge forming portion 324 conforms to a standard square recess for the respective driver size. In one example, distance 360 is between about 0.0852 inches and about 0.0842 inches, inclusive for a PSD 1-2 size driver. In one example, the inner transition surface forming portion (and resulting inner transition surfaces), are tapered inward toward the longitudinal axis of the punch integral nib 376 toward the tip forming portion 321 at a taper angle β with respect to the longitudinal axis of the integral nib 376. In one example the taper angle β is between about 3.5 degrees and about 4 degrees, inclusive. The taper angle taper angle t will establish the interference fit with the driver as will be discussed below. Therefore, other taper angles may also be appropriate in accordance with the design of the respective driver.

In one example, the groove apex forming portion 315 is tapered inward toward the longitudinal axis of the punch integral nib 376 toward the tip forming portion 321 at a groove apex taper angle α with respect to the longitudinal axis of the integral nib 376. In one example the groove apex taper angle α is between about 8 degrees and about 12 degrees, inclusive. In one example the groove apex taper angle α is about 10.4 degrees. The groove apex taper angle taper angle α will establish the stabilizing effect with the driver as will be discussed below. Therefore, other taper angles may also be appropriate in accordance with the design of the respective driver.

Figure 8:
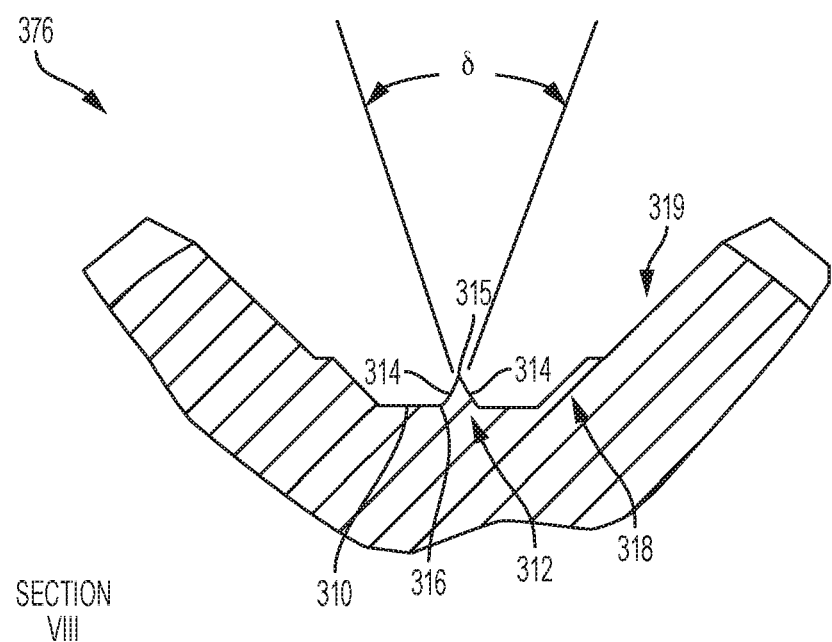
FIG. 8 is a cross section view of an example punch in accordance with disclosed embodiments.

FIG. 8 shows a cross section of one example of a groove forming portion 312. Groove footling portion 312 includes groove wall forming portions 314 connected together at groove apex forming portion 315. The groove wall forming portions 314 intersect the inner transition surface forming portions 310 at intersection lines 316. The angle δ between the groove wall forming portions may be any angle configured to provide the desired stability and based on the size and configuration of the recess. In one example, the angle δ is between about 40 degrees and about 60 degrees, or about 50.4 degrees for a PSD size 1-2 recess. However, other angles will be apparent from the present disclosure.

FIGS. 9-13 show various views of an example driver 200. Driver 200 has a recess-engageable portion formed on a shank (not shown). The driver 200 is of polygonal form that may be defined as generally cruciform in plan. The driver includes a central portion and a plurality of lobes 203 that radiate outwardly from the central portion. The lobes 203 are each defined by an installation sidewall 204, a removal sidewall 206, which are separated from each other by an outer transition surface 208, which is shown as downwardly and inwardly inclined (assuming the driver tip 221 is pointed down into a recess). The sidewalls 204 and 206 are referred to herein as installation sidewalls 204 and removal sidewalls 206 assuming the driver is installing or removing right handed fastener thread. An inner transition surface 210 extends between the installation and removal surfaces 204, 206 of adjacent lobes 203.

In one example, the lobes 203 generally conform in dimension to that of a standard cruciform shape or standard cruciform driver. The inner transition surfaces 110, in one example, generally conform to the shape of a standard square driver, for example those square drivers described in the IFI standard or otherwise dimensioned to engage with the standard recesses described in the IFI standard. Modifications to those standards will be apparent from the present disclosures. The recess engageable portion 202, in one example, has lobes 203 and inner transition surfaces 210, that may, in one example, generally conform to the various dimensions of a PSD driver, available as of this writing from Phillips Screw Company. However, features of the present disclosure may also be incorporated into non-driving surfaces of other fasteners and fastener systems. For example, embodiments of the present disclosure can be incorporated into existing driver designs, for example Phillips Screw Company's commercially available drivers, for example, those available under the trade designations Pozidriv®, Torq-Set®, Tri-Wing®, Phillips II®, Hexstix®, Torq-Set®, Mortorq®, Mortorq® Super, External Mortorq® Super, among others multi-winged fasteners having, for example, 2, 3, 4, 5, 6, or more wings. In addition, those fasteners/drivers disclosed that are, at least in part, defined by spiral segments, for example, those described in the Stacy patents, the Dilling patents, and/or the '540 application.

Continuing with the example embodiments of FIGS. 9-12, the outer transition surfaces 208 and the inner transition surfaces 210 merge into a generally convex driver end region 220. The outer transition surfaces 208 meet the end region 220 at end region outer transition edge 222. The inner transition surfaces 210 meet the end region 220 at the end region inner transition edge 224. At least one inner transition surface 210 includes a stabilizing rib 212. The stabilizing rib 212 extends radially outward from the inner transition surface 210. The stabilizing rib(s) 212 interact with corresponding stabilizing groove(s) to stabilize the driver within the recess and to minimize rocking of the driver.

Figure 9:
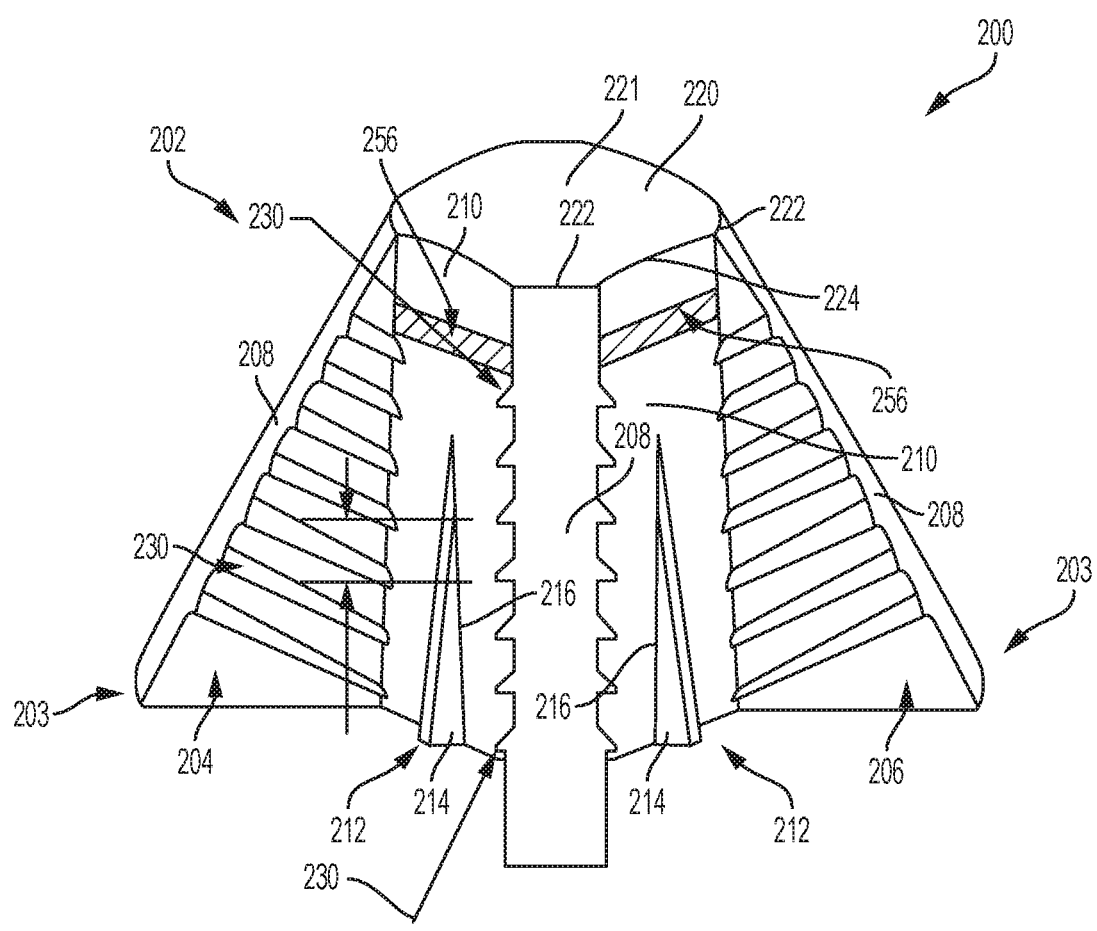
FIG. 9 is a perspective view of an example driver in accordance with disclosed embodiments.
Figure 11:
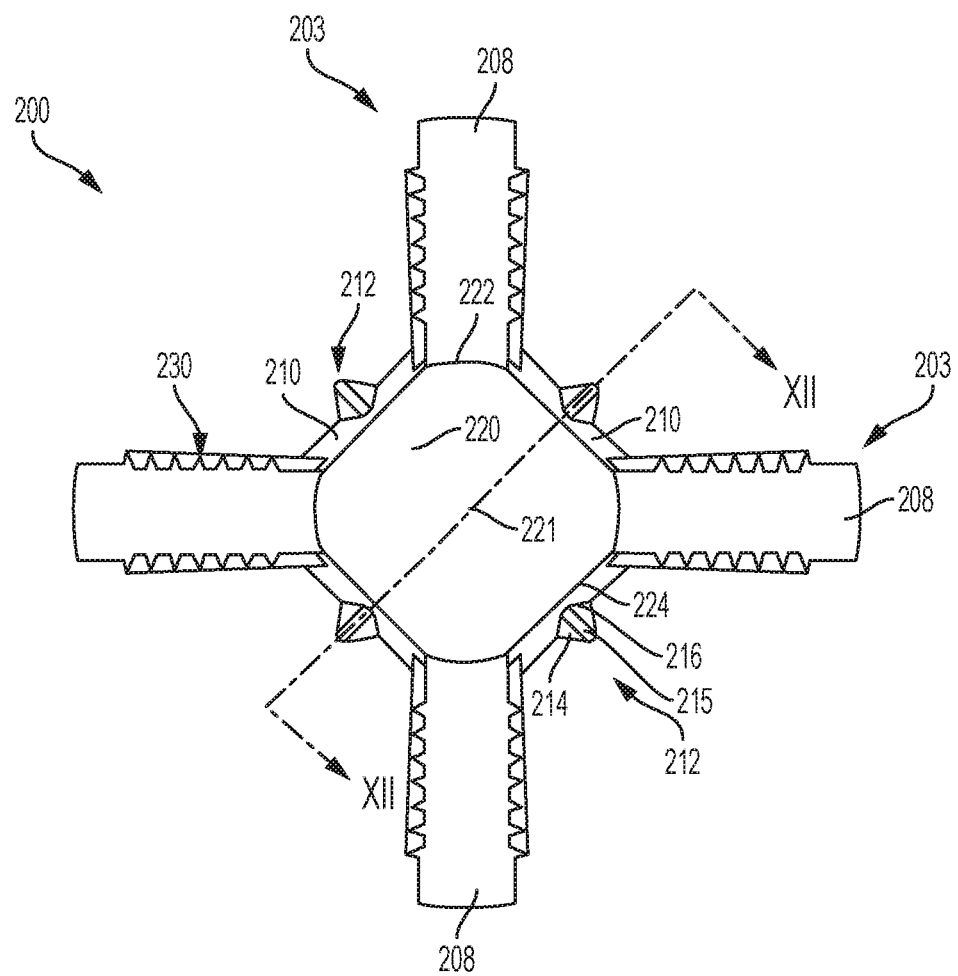
FIG. 11 is an end view of an example driver in accordance with disclosed embodiments.

In one example, the recess-engageable portion 202 includes more than one inner transition surfaces 208 having a stabilizing rib 212. For example, in one embodiment, diametrically opposed inner transition surfaces 210 each have stabilizing ribs 212. The recess-engageable portion 202 can include, for example, any number of pairs of diametrically opposed stabilizing ribs 212. As shown in FIGS. 9 and 11, the recess-engageable portion 202 includes two pairs of diametrically opposed stabilizing ribs 212, or in the alternative one, three, four, or more pairs for drivers with different configurations.

The stabilizing ribs 212, in one example, includes rib walls 214 connected together at rib apex 215 (FIG. 11). The rib walls 214 intersect the inner transition surfaces 210 at intersection lines 216. The angle between the groove walls may be any angle configured to provide the desired stability and also based on the size and configuration of the recess. In one example, the angle between the rib walls 214 is between about 60 degrees and about 80 degrees, or about 70 degrees for a PSD size 1-2 driver. In one example, the angle between the rib walls 214 is greater than the angle δ between groove wall forming portions 314 (and the corresponding formed recess). In one example having an angle between the rib walls 214 greater than the angle δ between groove wall forming portions 314 (or groove walls 114) promotes stability and surface contact between the driver bit rib and the recess groove when needed based on any imperfections of the primary square sticking feature, for example at the inner transition surfaces. Further, it helps eliminate unwanted rock of the driver bit within the recess back and forth.

The inner transition surfaces 210, in one example, are tapered inward toward the longitudinal axis of the fastener from the shank of the driver towards the end region 220/tip 221. The taper of the inner transition surfaces 210 establishes interference surfaces 256 (indicated in diagonal markings) for providing an interference fit with cooperating surfaces of the corresponding recess.

One or both of the installation or removal sidewalls 204,206 may be provided, in one example, with torque ribs 230. The torque ribs 230 can be provided to reduce cam-out and other advantages disclosed within the '634 patents.

Figure 10:
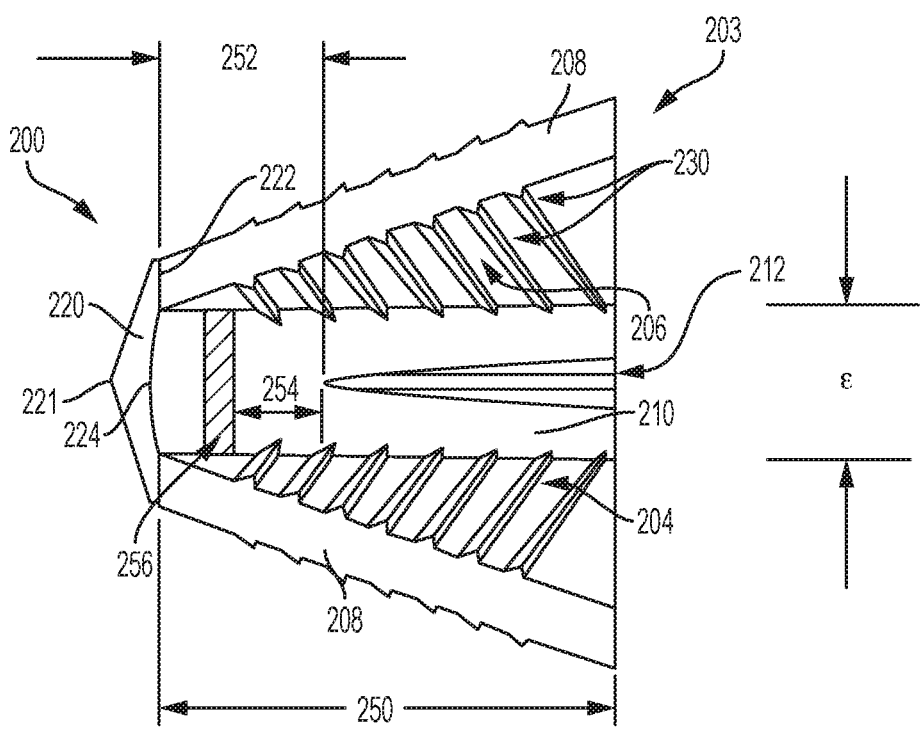
FIG. 10 is a side view of an example driver in accordance with disclosed embodiments.

With respect to FIG. 10, stabilizing ribs 212 begin a distance 252 from the end region outer transition edge 222 and continues to a distance 250 from the end region outer transition edge 222. In one example, the distance 250 may end at the upper limit of lobes 203, or in another example, continue past lobes 203. The edges of the inner transition surfaces 210, i.e., where the inner transition surfaces 210 meet the lobes 203 may form an angle E, which may also conform to a corresponding recess angle. In one example E is about 1.5 degrees for PSD size 1-2 driver. In one particular example, distance 252 is greater than zero such that the groove 112 does not extend to the bottom region 120. In one particular example, stabilizing rib 212 has a rib clearance distance 254 greater than about zero from the top of the interference surface 256.

FIG. 11 shows an end view looking towards the tip 221 of driver 200 having four lobes 203 and four stabilizing ribs 212. From this view it can be seen that inner transition surfaces 210 are tapered inward toward the tip 221.

Figure 12:
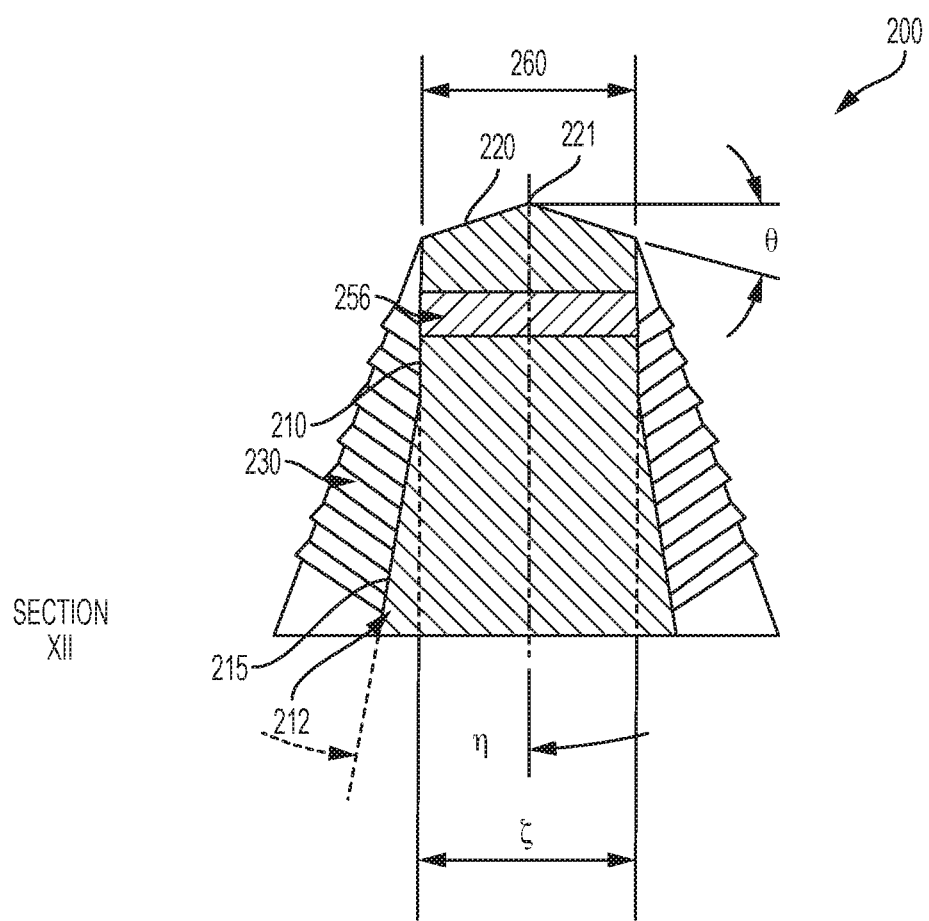
FIG. 12 is a cross section view of an example driver in accordance with disclosed embodiments.

FIG. 12 shows a cross section of FIG. 11. In one example, the distance 260 between the opposing inner transition surfaces 210 at the end region inner transition edge 224 conforms to a standard square driver size. In one example, distance 260 is between about 0.0889 inches and about 0.0879 inches, inclusive for a PSD 1-2 size driver. In one example, the inner transition surface, are tapered inward toward the longitudinal axis of the driver at a taper angle $\zeta$ with respect to the longitudinal axis of the driver 200. In one example the taper angle $\zeta$ is between about 4.5 degrees and about 5.5 degrees, inclusive. In addition, those fasteners/drivers disclosed that are, at least in part, defined by spiral segments, for example, the Stacy patents, the Dilling patents, and/or the '540 application. The disclosures of these patents are incorporated herein by reference in each of their entireties. In one particular example, the taper angle $\zeta$ is larger than taper angle $\beta$ of the associated recess, thereby creating, in one example, an interference fit in interference fit region 256. Other taper angles may also be appropriate in accordance with the design of the respective recess.

In one example, the stabilizing rib apex 315 is tapered inward toward the longitudinal axis of the driver 200 toward the tip 221 at a stabilizing rib apex taper angle $\eta$ with respect to the longitudinal axis of the integral nib driver 200. In one example, the stabilizing rib apex taper angle $\eta$ is between about 6 degrees and about 10 degrees, or between about 7.5 degrees and about 8.5 degrees, inclusive for a PSD 1-2 size driver. In one example, the stabilizing rib taper angle $\eta$ is less than the taper angle $\gamma$ of the corresponding recess groove 112 which can provide additional clearance between the stabilizing rib 212 and corresponding groove 112 when mated. Other taper angles may also be appropriate in accordance with the design of the respective recess.

Figure 13:
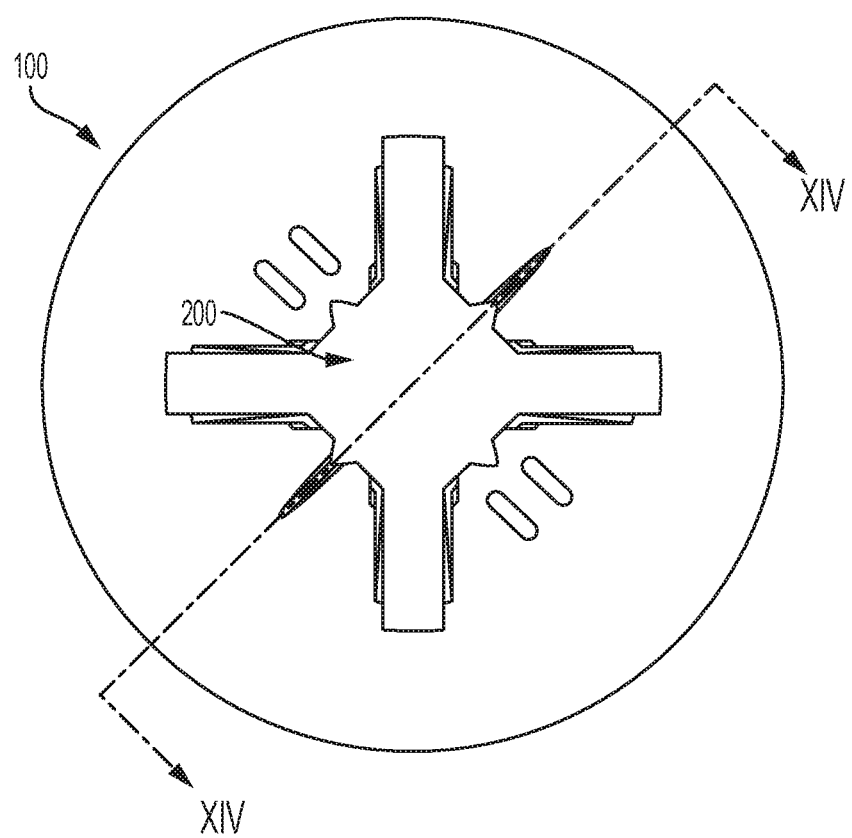
FIG. 13 is an end view of an example driver mated with an example recess in accordance with disclosed embodiments.

FIG. 13 shows a top view of an example fastener 100 with driver 200 inserted therein. The remaining portion of the driver including the shaft is not shown for clarity.

Figure 14:
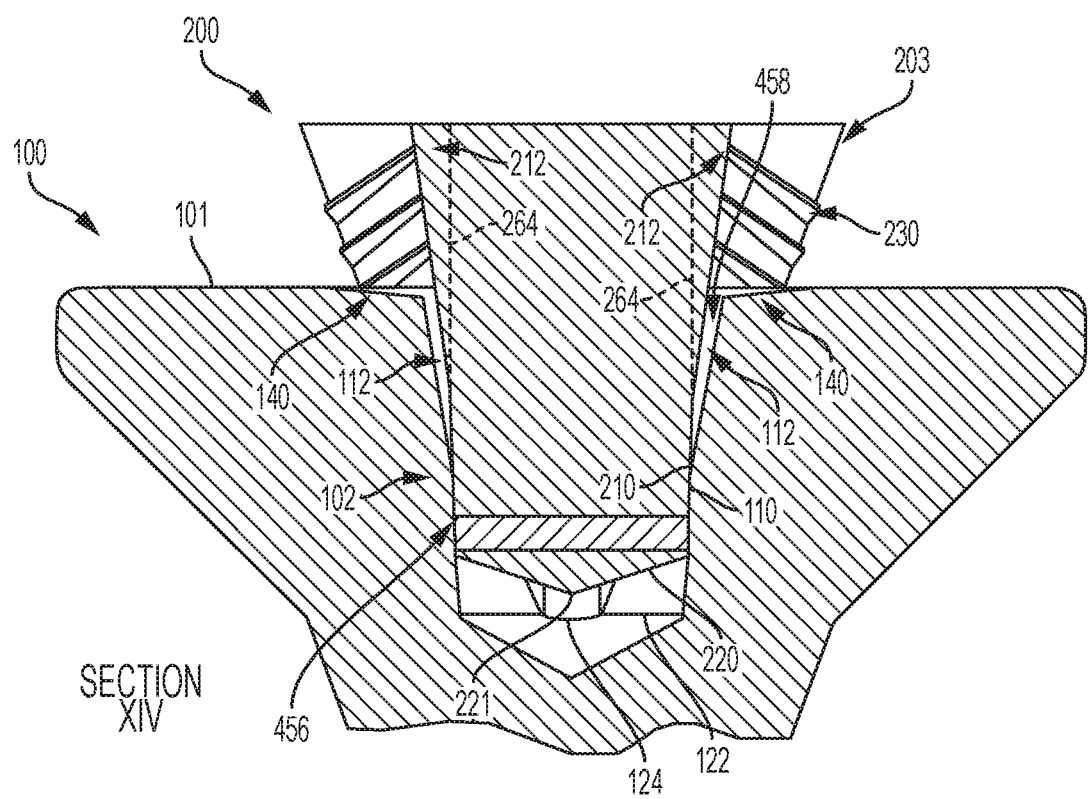
FIG. 14 is a cross section view of an example driver mated with an example recess in accordance with disclosed embodiments.

FIG. 14 shows a cross section view of FIG. 13 showing driver 200 engaged within recess 102. Dashed lines 264 has been added to indicate the profile of the corresponding stabilizer ribs 212 outside of the dashed lines. The inner transition surfaces 110 and 210 in normal coaxial insertion between the driver 200 and fastener 100 establish an interference fit 456 preventing the driver tip 221 from bottoming out in the recess. The amount and degree of stick fit can be manipulated according to fastener and driver design requirements in accordance with this specification. Further, in normal coaxial insertion between the driver 200 and fastener 100, clearance 458 is present between the stabilizing rib 212 and groove 112. This clearance, in one example, may also be included in order to favor establishing a stick fit 456 over rib 212 to groove 212 contact.

However, if the driver 200 were to be rocked within the recess 102, or inserted at an angle with respect to the longitudinal axis of the recess 102, the stabilizing rib 212 would engage the corresponding groove 112 to provide stability. Further, the stabilizing ribs 212 and grooves 112 may also provide stability should the dimensions of the inner transition surfaces 210 or other driver dimensions be out of normal tolerances such that a desired stick fit 456 is not fully obtained.

Figure 15:
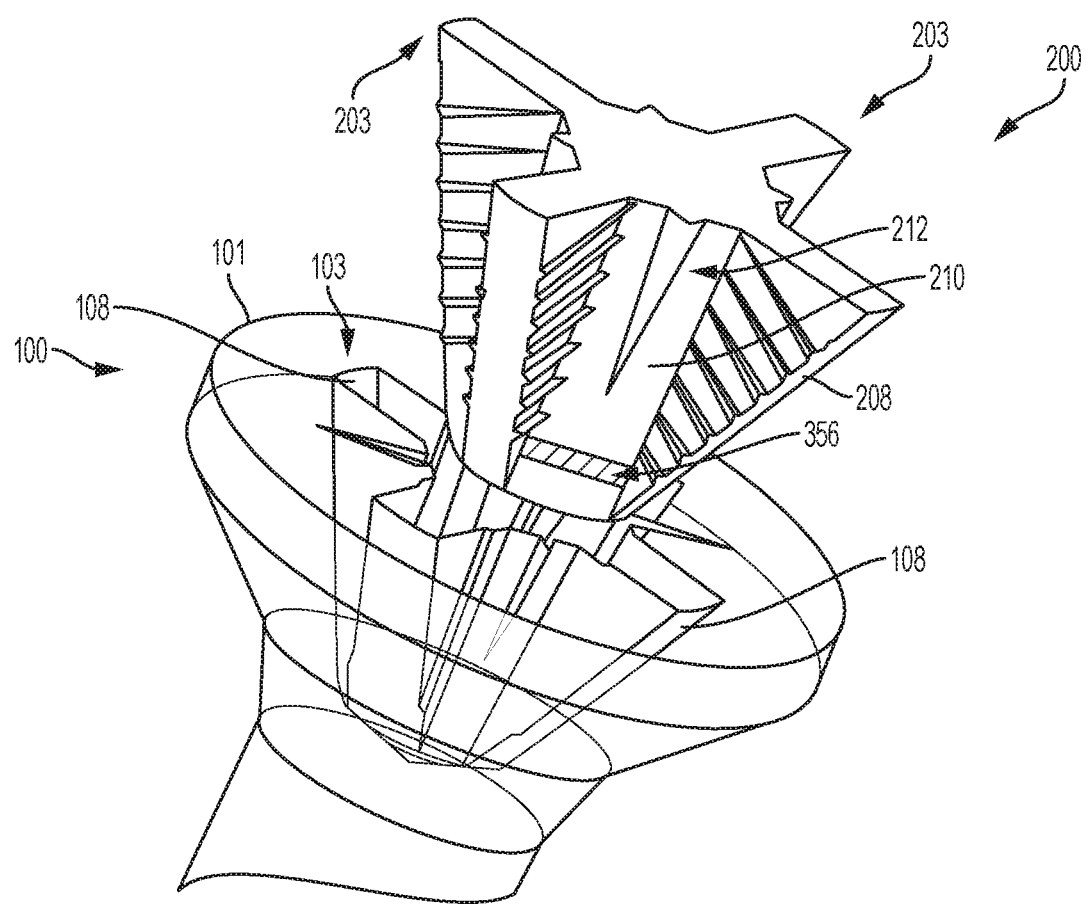
FIG. 15 is a perspective view of an example driver being mated with an example recess in accordance with disclosed embodiments.
Figure 16:
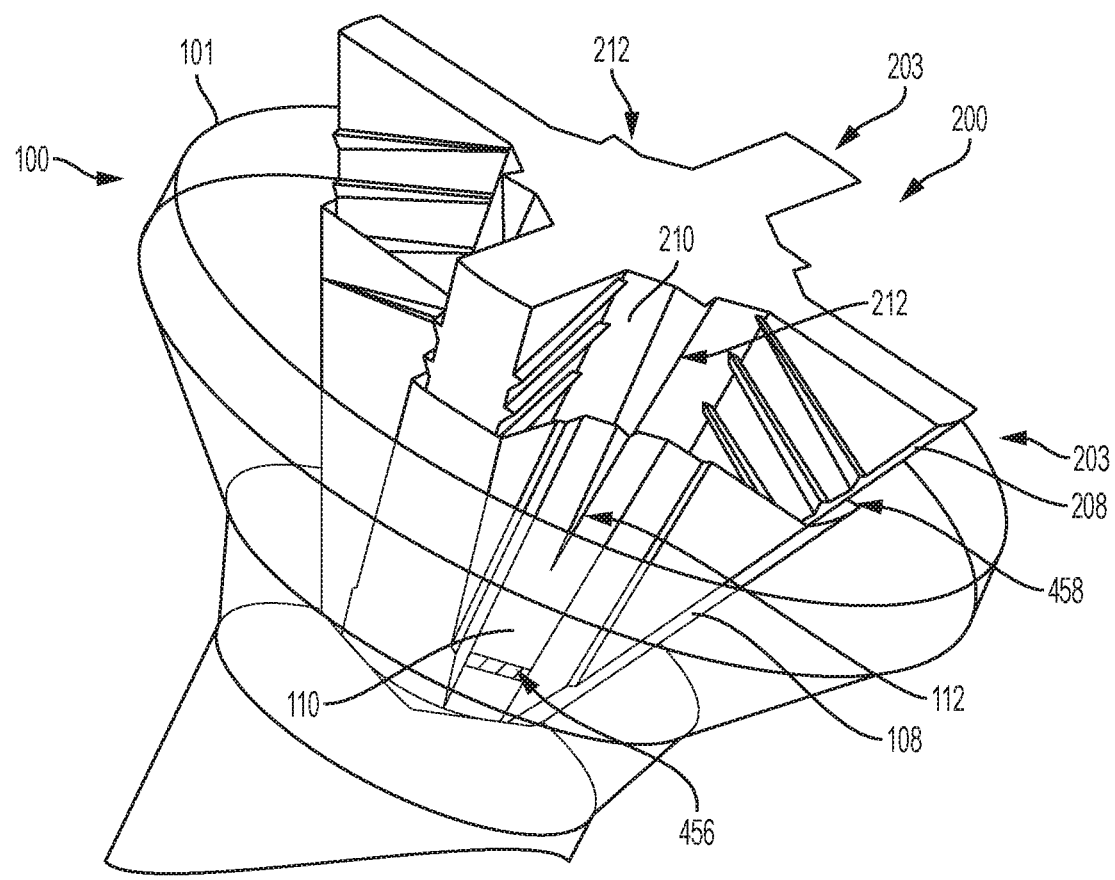
FIG. 16 is a perspective view of an example driver mated with an example recess in accordance with disclosed embodiments.

With continuing reference to FIGS. 15 and 16, in one example, the driver lobe 203 and recess wings 103 may be configured such that a clearance 458 (FIG. 16) is present between the outer transition surfaces 108, 208 of the recess and drivers, respectively. This clearance 458 (FIG. 16) may be included to further ensure a stick fit 456 is established between respective inner transition surfaces 110, 210 instead of bottoming the driver outer transition surfaces 208 to the recess outer transition surfaces 108. In one non-limiting example, clearance 458 may be about 0.0020 inches for a PSD 1-2 sized driver and corresponding recess. In one non-limiting example, clearance 458 in between about 0.002 inches and about 0.010 inches, inclusive for a PSD 0-1, 1-2, 2-2 and 3-3 sized drivers.

Increasing the stability of the driver, i.e., the driver axis is more in line with the recess axis, has a number of non-limiting advantages. For example, by maintaining stability of the driver within the recess, an improved stick fit 456 may occur which may increase the speed of application fasteners to the work piece. Further the lobes 203 may have improved engagement with the wings 103 which will decrease cam-out and drive/recess damage.

Figure 17:
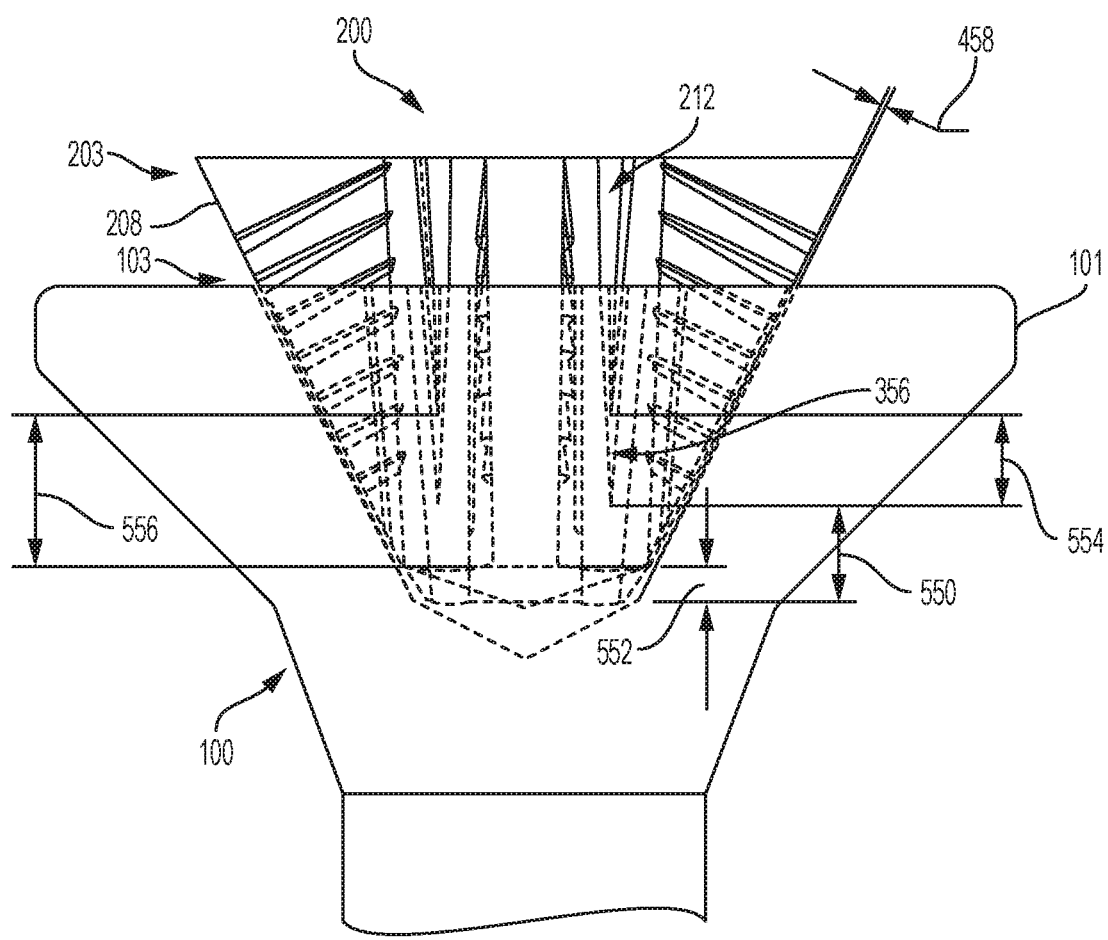
FIG. 17 is a cross section view of an example driver mated with an example recess in accordance with disclosed embodiments.

FIG. 17 shows and shows an example driver 200 engaged with example fastener 100, as well as example, non-limiting dimensions in accompanying table 2.

TABLE 2

| | (inches) | | | |
| --- | --- | --- | --- | --- |
| DRIVE SIZE | 550 | 552 | 554 | 556 |
| PSD 0-1 | .049 | .033 | .020 | .036 |
| PSD 1-2 | .040 | .015 | .035 | .060 |
| PSD 2-2 | .062 | .037 | .035 | .060 |
| PSD 3-3 | .041 | .020 | .045 | .066 |

Dimension Formulas: (554 + 550) − 552 = 556

In this manner a new and unique fasteners, drivers, punches, and fastener systems are presented that provides an improvement in stability characteristics with respect to the driver recess engagement and also improve the overall performance of the fastener system.

It should be understood that the above description is only illustrative of the invention. Various alternatives and modifications can be devised by those skilled in the art without departing from the invention. Accordingly, the present invention is intended to embrace all such alternatives, modifications and variances.

What is claimed as new and desired to be protected by Letters Patent of the United States is:

1. A fastener system comprising:
a fastener having a recess, the recess comprising:
a central recess core having a recess bottom region;
a plurality of wings radiating outwardly from the central recess core, the wings each being defined by a pair of recess sidewalls and a recess outer transition surface adjoining the recess sidewalls, the recess outer transition surface extending from a top of the recess and connected to the bottom region and forming a bottom region transition edge at the intersection of the recess bottom region and the recess outer transition surface;
at least one recess inner transition surface connecting a recess sidewall of a first wing to a recess sidewall of a second wing, the first and second wings being adjacent to each other;
a groove in the recess inner transition surface extending in a radially outward direction from the recess inner transition surface, the groove extending from a groove first distance from the recess bottom region transition edge to a groove second distance from the recess bottom region transition edge, the groove first distance being non zero;
wherein at least one of the recess inner transition surfaces includes a recess interference surface having a top defined by a design recess interference region and a distance from the recess interference top to the recess bottom region transition edge is less than the groove first distance;
a driver for engaging the recess of the fastener, the driver comprising:
a shank portion and a recess-engaging portion formed at an end of the shank portion, the recess-engaging portion comprising a driver central driver core having an end region and a plurality of lobes radiating outwardly from the driver central core, each lobe being defined by a pair of driver sidewalls and a driver outer transition surface adjoining the driver sidewalls, the driver outer transition surface extending from the shank portion and connected to the end region and forming an end region outer transition edge at the intersection with the driver end region;
at least one driver inner transition surface connecting a driver sidewall of a first lobe to a driver sidewall of a second lobe, the first and second lobes being adjacent to each other; and
a stabilizing rib on the driver inner transition surface extending in a radially outward direction from the driver central core, the stabilizing rib extending from a rib first distance from the end region outer transition edge to a rib second distance from the driver end region outer transition edge, the rib first distance being non-zero,
at least one of the driver inner transition surfaces includes a driver interference surface having a top defined by a design driver interference region and a distance from the driver interference surface top to the driver end region outer transition edge is less than the rib first distance;

wherein, in normal coaxial insertion between the driver (200) and the fastener (100), the recess interference surfaces (156) and the driver interference surfaces (256) establish an interference fit (456) preventing the driver end region (220) from bottoming out in the recess (102) bottom region (120), and a clearance (458) is present between the stabilizing rib (212) and the groove (112);

wherein the groove comprises a first and second groove walls, the first and second groove walls meeting at a groove apex, the groove apex being tapered radially inward as the groove extends in a direction from the top of the recess toward the bottom region wherein the stabilizing rib comprises a first and second rib walls, the first and second rib walls meeting at a stabilizing rib apex, the rib apex being tapered radially inward as the stabilizer rib extends toward the end region wherein the groove apex within the recess inner transition surface is tapered at a groove apex taper angle with respect to a longitudinal axis of the fastener and the stabilizing rip apex is tapered at a stabilizing apex taper angle with respect to a longitudinal axis of the driver, the groove apex taper angle being larger than the stabilizing apex taper angle.

2. The fastener system of claim 1, wherein the groove apex is tapered at an angle of between about 8 degrees and about 12 degrees, inclusive, from the longitudinal axis of the fastener.

3. The fastener system of claim 1, wherein the groove apex is tapered at an angle of 10.4 degrees from the longitudinal axis of the fastener.

4. The fastener system of claim 1, wherein the stabilizer apex is tapered at an angle of between about 6 degrees and about 10 degrees, inclusive, from the longitudinal axis of the driver.

5. The fastener system of claim 1, wherein the stabilizer apex is tapered at an angle of between about 7.5 and 8.5 degrees, inclusive, from the longitudinal axis of the driver.

6. The fastener system of claim 1, wherein there is an angle of between about 40 degrees and about 60 degrees, inclusive, between the first and second groove walls.

7. The fastener system of claim 1, wherein there is an angle of 50.4 degrees between the first and second groove walls.

8. The fastener system of claim 1, wherein there is an angle of between about 60 degrees and about 80 degrees, inclusive, between the first and second rib walls.

9. The fastener system of claim 1, wherein there is an angle of about 70 degrees between the first and second rib walls.

10. The fastener system of claim 1, wherein the groove apex intersects the recess inner transition surface at the first distance from the bottom region transition edge.

11. The fastener system of claim 1, wherein the stabilizing rib apex meets the recess inner transition surface at the first distance from the end region outer transition edge.

12. The fastener system of claim 1, wherein a first and second intersection line, formed at the intersection of the first and second groove walls with the recess inner transition surface, respectively, form an angle of between about 6.5-7.0 degrees between the groove walls.

13. The fastener system of claim 1, wherein at least one of the recess sidewalls further comprises a relieved region defined radially inwardly of its associated recess outer transition surface to define a relatively raised torque pad between the recess outer transition surface and the central recess core, the torque pad being an elongate strip and extending longitudinally along a margin of the sidewall that adjoins the outer transition surface.

14. The fastener system of claim 1, wherein the recess comprises 4 wings and at least 2 of the inner transition surfaces have the recess groove.

15. The fastener system of claim 1, further comprising a clearance distance between the top of the design recess interference region and the groove.

16. The fastener system of claim 1, further comprising a clearance distance between the top of the driver interference region and the rib.

17. The fastener system of claim 1, where the driver inner transition surfaces are tapered at an angle with respect to the longitudinal axis of the driver and the recess inner transition surfaces are tapered at an angle with respect to the longitudinal axis of the recess.

18. The fastener system of claim 17, wherein the driver inner transition surface taper angle is less than the recess inner transition surface taper angle.

19. The fastener system of claim 17, wherein the recess inner transition surface is tapered at an angle of between about 2.5 degrees and about 4 degrees, inclusive, from a longitudinal axis of the fastener.

20. The fastener system of claim 17, wherein the recess inner transition surface is tapered at an angle of between about 3.5-4.0 degrees, inclusive, from a longitudinal axis of the fastener.

21. The fastener system of claim 17, wherein the driver inner transition surface is tapered at an angle of between about 2.25 degrees and 2.75 degrees, inclusive from a longitudinal axis of the fastener.

22. The fastener system of claim 1, wherein driver further comprises, at least one torque rib formed on at least one sidewall of at least one of the sidewalls of the lobes, the at least one torque rib being oriented to extend substantially perpendicular to the outer transition surface of the lobe and increasing in cross-sectional area in a radially outward direction.

23. The fastener system of claim 22, wherein the radially outermost end of the at least one torque rib define the widest portion of the lobe.

24. The fastener system of claim 22, wherein the at least one torque rib is generally triangular in a transverse cross-section.

25. A fastener system comprising:
a fastener having a recess, the recess comprising:
a central recess core having a bottom region;
a plurality of pairs of recess installation and removal sidewalls extending from a top of the recess and connected to the bottom region and forming a bottom region transition edge at the intersection of the bottom region and the recess sidewalls;
at least one recess inner transition surface connecting a recess sidewall of a first pair of recess sidewalls to a recess sidewall of a second pair of recess sidewalls, the first and second pairs of recess installation and removal sidewalls being adjacent to each other;
a groove in the recess inner transition surface extending in a radially outward direction from the recess inner transition surface, the groove extending from a first distance from the bottom region transition edge to a second distance from the bottom region transition edge, the first distance being non zero;

wherein at least one of the recess inner transition surfaces includes a recess interference surface having a top defined by a design recess interference region and a distance from the recess interference top to the recess bottom region transition edge is less than the groove first distance;

a driver for engaging the recess of the fastener, the driver comprising:
a shank portion and a recess-engaging portion formed at an end of the shank portion, the recess-engaging portion comprising a driver central driver core having an end region and a plurality of pairs of driver installation and removal sidewalls radiating outwardly from the driver central core, the driver installation and removal sidewalls being connected to the end region and forming an end region outer transition edge at the intersection of the driver installation and removal sidewalls with the driver end region;
at least one driver inner transition surface connecting a driver sidewall of a first pair of driver sidewalls to a driver sidewall of a second pair of driver sidewalls, the first and second pairs of driver installation and removal sidewalls being adjacent to each other; and
a stabilizing rib on the driver inner transition surface extending in a radially outward direction from the driver central core, the stabilizing rib extending from a first distance from end region outer transition edge to a second distance from the end region outer transition edge, the first distance being non-zero,
at least one of the driver inner transition surfaces includes a driver interference surface having a top defined by a design driver interference region and a distance from the driver interference surface top to the driver end region outer transition edge is less than the rib first distance;
wherein, in normal coaxial insertion between the driver (200) and the fastener (100), the recess interference surfaces (156) and the driver interference surfaces (256) establish an interference fit (456) preventing the driver end region (220) from bottoming out in the recess (102) bottom region (120), and a clearance (458) is present between the stabilizing rib (212) and the groove (112);
wherein the groove comprises a first and second groove walls, the first and second groove walls meeting at a groove apex, the groove apex being tapered radially inward as the groove extends in a direction from the top of the recess toward the bottom region
wherein the stabilizing rib comprises a first and second rib walls, the first and second rib walls meeting at a stabilizing rib apex, the rib apex being tapered radially inward as the stabilizer rib extends toward the end region
wherein the groove apex within the recess inner transition surface is tapered at a groove apex taper angle with respect to a longitudinal axis of the fastener and the stabilizing rip apex is tapered at a stabilizing apex taper angle with respect to a longitudinal axis of the driver, the groove apex taper angle being larger than the stabilizing apex taper angle.

26. The fastener system of claim 25, wherein the recess inner transitions surfaces and the driver inner transition surfaces each conform a shape of a square.

27. The fastener system of claim 25, wherein the groove apex is tapered at an angle of between about 8 degrees and about 12 degrees, inclusive, from the longitudinal axis of the fastener.

28. The fastener system of claim 25, wherein the groove apex is tapered at an angle of 10.4 degrees from the longitudinal axis of the fastener.

29. The fastener system of claim 25, wherein the stabilizer apex is tapered at an angle of between about 6 degrees and about 10 degrees, inclusive, from the longitudinal axis of the driver.

30. The fastener system of claim 25, wherein the stabilizer apex is tapered at an angle of between about 7.5 and 8.5 degrees, inclusive, from the longitudinal axis of the driver.

31. The fastener system of claim 25, wherein there is an angle of between about 40 degrees and about 60 degrees, inclusive, between the first and second groove walls.

32. The fastener system of claim 25, wherein there is an angle of 50.4 degrees between the first and second groove walls.

33. The fastener system of claim 25, wherein there is an angle of between about 60 degrees and about 80 degrees, inclusive, between the first and second rib walls.

34. The fastener system of claim 25, wherein there is an angle of about 70 degrees between the first and second rib walls.

35. The fastener system of claim 25, wherein the groove apex intersects the recess inner transition surface at the first distance from the bottom region transition edge.

36. The fastener system of claim 25, wherein the stabilizing rib apex meets the recess inner transition surface at the first distance from the end region outer transition edge.

37. The fastener system of claim 25, wherein a first and second intersection line, formed at the intersection of the first and second groove walls with the recess inner transition surface, respectively, form an angle of between about 6.5-7.0 degrees between the groove walls.

38. The fastener system of claim 25, wherein at least one of the recess sidewalls further comprises a relieved region defined radially inwardly of its associated recess outer transition surface to define a relatively raised torque pad between the recess outer transition surface and the central recess core, the torque pad being an elongate strip and extending longitudinally along a margin of the sidewall that adjoins the outer transition surface.

39. The fastener system of claim 25, wherein the recess comprises 4 pairs of recess installation and removal sidewalls and at least 2 of the inner transition surfaces have the recess groove.

40. The fastener system of claim 25, further comprising a clearance distance between the top of the recess interference region and the groove.

41. The fastener system of claim 25, further comprising a clearance distance between the top of the driver interference region and the rib.

42. The fastener system of claim 25, where the driver inner transition surfaces are tapered at an angle with respect to the longitudinal axis of the driver and the recess inner transition surfaces are tapered at an angle with respect to the longitudinal axis of the recess.

43. The fastener system of claim 42, wherein the driver inner transition surface taper angle is less than the recess inner transition surface taper angle.

44. The fastener system of claim 42, wherein the recess inner transition surface is tapered at an angle of between about 2.5 degrees and about 4 degrees, inclusive, from a longitudinal axis of the fastener.

45. The fastener system of claim 42, wherein the recess inner transition surface is tapered at an angle of between about 3.5-4.0 degrees, inclusive, from a longitudinal axis of the fastener.

46. The fastener system of claim 42, wherein the driver inner transition surface is tapered at an angle of between about 2.25 degrees and 2.75 degrees, inclusive from a longitudinal axis of the fastener.

47. The fastener system of claim 25, wherein driver further comprises, at least one torque rib formed on at least one sidewall of at least one of the sidewalls of the pairs of driver installation and removal sidewalls, the at least one torque rib being oriented to extend substantially perpendicular to an outer transition surface of the pairs of driver installation and removal sidewalls and increasing in cross-sectional area in a radially outward direction.

48. The fastener system of claim 47, wherein the radially outermost end of the at least one torque rib define the widest portion of the pairs of driver installation and removal sidewalls.

49. The fastener system of claim 47, wherein the at least one torque rib is generally triangular in a transverse cross-section.

50. A fastener system comprising:
   a fastener having a recess, the recess comprising:
      a central recess core having a bottom region;
      a plurality of wings radiating outwardly from the central recess core, the wings each being defined by a pair of recess sidewalls and a recess outer transition surface adjoining the recess sidewalls, the recess outer transition surface extending from a top of the recess and connected to the bottom region and forming a bottom region transition edge at the intersection of the bottom region and the outer transition surface;
      at least one recess inner transition surface connecting a recess sidewall of a first wing to a recess sidewall of a second wing, the first and second wings being adjacent to each other;
      a groove in the recess inner transition surface extending in a radially outward direction from the recess inner transition surface, the groove extending from a first distance from the bottom region transition edge to a second distance from the bottom region transition edge, the first distance being non zero;
      wherein at least one of the recess inner transition surfaces includes a recess interference surface defining a design recess interference region located between the groove 112 and the recess bottom region 120;
   a driver for engaging the recess of the fastener, the driver comprising:
      a shank portion and a recess-engaging portion formed at an end of the shank portion, the recess-engaging portion comprising a driver central driver core having an end region and a plurality of lobes radiating outwardly from the driver central core, each lobe being defined by a pair of driver sidewalls and a driver outer transition surface adjoining the driver sidewalls, the driver outer transition surface extending from the shank portion and connected to the end region and forming an end region outer transition edge at the intersection with the driver end region;
      at least one driver inner transition surface connecting a driver sidewall of a first lobe to a driver sidewall of a second lobe, the first and second lobes being adjacent to each other; and
      a stabilizing rib on the driver inner transition surface extending in a radially outward direction from the driver central core, the stabilizing rib extending from a first distance from end region outer transition edge to a second distance from the end region outer transition edge, the first distance being non-zero,
      at least one of the driver inner transition surfaces includes a driver interference surface defining a design driver interference region located between the stabilizing rib and the driver end region;
   wherein, in normal coaxial insertion between the driver (200) and the fastener (100), the recess interference surfaces (156) and the driver interference surfaces (256) establish an interference fit (456) located between located between the groove 112 and the recess bottom region 120 and between the stabilizing rib and the driver end region outer transition edge preventing the driver end region (220) from bottoming out in the recess (102) bottom region (120).

51. The fastener system of claim 50, wherein, in normal coaxial insertion between the driver (200) and the fastener (100), a clearance (458) is present between the stabilizing rib (212) and the groove (112).

52. The fastener system of claim 51, wherein the groove comprises a first and second groove walls, the first and second groove walls meeting at a groove apex, the groove apex being tapered radially inward as the groove extends in a direction from the top of the recess toward the bottom region;
   wherein the stabilizing rib comprises a first and second rib walls, the first and second rib walls meeting at a stabilizing rib apex, the rib apex being tapered radially inward as the stabilizer rib extends toward the end region; and
   wherein the groove apex is tapered at a groove apex taper angle with respect to a longitudinal axis of the fastener and the stabilizing rip apex is tapered at a stabilizing apex taper angle with respect to a longitudinal axis of the driver, the groove apex taper angle being larger than the stabilizing apex taper angle.

* * * * *